(12) United States Patent
Huh et al.

(10) Patent No.: US 12,346,184 B2
(45) Date of Patent: Jul. 1, 2025

(54) REDUCED COMMON MODE VOLTAGE PULSE WIDTH MODULATION SWITCHING SCHEME WITH CAPACITOR VOLTAGE BALANCING FOR A MULTILEVEL POWER CONVERTER

(71) Applicant: General Electric Company, Schenectady, NY (US)

(72) Inventors: Kum Kang Huh, Niskayuna, NY (US); Hridya Ittamveettil, Bengaluru (IN); Luis J. Garces, Niskayuna, NY (US); Rajib Datta, Niskayuna, NY (US); Di Pan, Schenectady, NY (US); Yukai Wang, Schenectady, NY (US)

(73) Assignee: General Electric Company, Evendale, OH (US)

( * ) Notice: Subject to any disclaimer, the term of this patent is extended or adjusted under 35 U.S.C. 154(b) by 22 days.

(21) Appl. No.: 18/307,375

(22) Filed: Apr. 26, 2023

(65) Prior Publication Data

US 2024/0248522 A1 Jul. 25, 2024

(30) Foreign Application Priority Data

Jan. 19, 2023 (IN) .............................. 202311003782

(51) Int. Cl.
*G06F 1/00* (2006.01)
*B64D 41/00* (2006.01)
(Continued)

(52) U.S. Cl.
CPC ............... *G06F 1/30* (2013.01); *B64D 41/00* (2013.01); *H02M 1/0043* (2021.05); *H02M 7/797* (2013.01); *G06F 1/3203* (2013.01)

(58) Field of Classification Search
CPC ........ G06F 1/30; B64D 41/00; H02M 1/0043; H02M 7/797; H02M 1/0025; H02M 1/123;
(Continued)

(56) References Cited

U.S. PATENT DOCUMENTS 6,842,354 B1 * 1/2005 Tallam ................. H02M 7/483
363/132
7,274,576 B1 * 9/2007 Zargari ................. H02M 1/44
363/39
(Continued)

FOREIGN PATENT DOCUMENTS

TW 439350 B 6/2001

OTHER PUBLICATIONS

Zhang et al., Multilevel Inverter Modulation Schemes to Eliminate Common-Mode Voltages, IEEE Transactions on Industry Applications, vol. 36, Issue 6, Nov./Dec. 2000, 3 pp. 1645-1653. (Abstract Only).

(Continued)

*Primary Examiner* — Volvick Derose
(74) *Attorney, Agent, or Firm* — Dority & Manning, P.A.

(57) ABSTRACT

A multilevel power converter includes a plurality of switches, a first DC link capacitor, a second DC link capacitor, and one or more processors configured to: generate, for a duty cycle of the multilevel power converter, a pulse width modulated pulse pattern in accordance with a reduced common mode voltage scheme; modify the pulse width modulated pulse pattern to render a modified pulse pattern; and cause the plurality of switches to implement the duty cycle based at least in part on the modified pulse pattern to render a common mode voltage pulse to balance voltages at the first DC link capacitor and the second DC link capacitor.

20 Claims, 11 Drawing Sheets

(51) Int. Cl.
*G06F 1/30* (2006.01)
*H02M 1/00* (2006.01)
*H02M 7/797* (2006.01)
*G06F 1/3203* (2019.01)

(58) Field of Classification Search
CPC .... H02M 7/217; H02M 7/4833; H02M 7/487; H02M 7/5395
USPC .......................................................... 713/340
See application file for complete search history.

(56) References Cited

U.S. PATENT DOCUMENTS

| | | | |
|---|---|---|---|
| 7,400,518 B2 | 7/2008 | Yin et al. | |
| 9,325,252 B2 | 4/2016 | Narimani et al. | |
| 9,520,800 B2 | 12/2016 | Tian et al. | |
| 9,559,610 B2* | 1/2017 | Duan | H02M 7/487 |
| 10,153,706 B2* | 12/2018 | Ying | H02M 5/4585 |
| 10,892,682 B2 | 1/2021 | Dilley et al. | |
| 11,121,642 B2 | 9/2021 | Wang et al. | |
| 11,258,387 B1* | 2/2022 | Wagoner | H02M 7/487 |
| 2012/0187894 A1* | 7/2012 | Higuchi | H02P 27/08 318/811 |
| 2013/0241463 A1* | 9/2013 | Bando | H02P 9/102 318/810 |
| 2015/0008750 A1* | 1/2015 | Shen | H02M 7/487 307/82 |
| 2015/0180273 A1* | 6/2015 | Wagoner | H02J 3/28 307/31 |
| 2015/0194902 A1* | 7/2015 | Tian | H02M 7/4833 363/37 |
| 2015/0200602 A1* | 7/2015 | Narimani | H02M 5/4585 363/37 |
| 2016/0315540 A1* | 10/2016 | Dilley | H02M 7/797 |
| 2017/0070175 A1* | 3/2017 | Butzmann | H02M 7/5387 |
| 2019/0058385 A1* | 2/2019 | Lazaro | H02M 3/158 |
| 2019/0149078 A1* | 5/2019 | Sumasu | H02M 1/44 318/400.02 |
| 2022/0231618 A1* | 7/2022 | Yan | H02M 3/1584 |
| 2022/0255457 A1* | 8/2022 | Kojima | H02M 1/325 |
| 2024/0190294 A1* | 6/2024 | Lee | B60L 58/20 |
| 2024/0290248 A1* | 8/2024 | Kim | H04L 25/0272 |

OTHER PUBLICATIONS

Banda et al., "Analysis and Estimation of Neutral-Point Voltage Balancing Ability of an Optimized Balancing Algorithm for Grid Connected Active-NPC converter", 2022 24$^{th}$ European Conference on Power Electronics and Applications, EPE Association, Sep. 2022, pp. 1-8.

Choi et al., "Neutral-Point Voltage Balancing Method for Three-Level Inverter Systems with a Time-Offset Estimation Scheme", Journal of Power Electronics, vol. 13, No. 2, Mar. 2013, pp. 243-249.

Guo et al., "An Enhanced Virtual Space Vector Modulation Scheme of Three-Level NPC Converters for More-Electric-Aircraft Applications", IEEE Transactions on Industry Applications, New Jersey, Jun. 2021, pp. 5239-5251.

Kitidet et al., "A CB-SVPWM Control Strategy for Neutral-Point Voltage Balancing in Three-Level NPC Inverters", 2017 IEEE Region 10 Conference (TENCON), Nov. 2017, pp. 1766-1771.

Nguyen et al., "Carrier Based PWM Control of 3-Level NPC Inverter with DC Neutral Point Balancing and Common Mode Voltage Reduction", 2019 10$^{th}$ International Conference on Power Electronics and ECCE Asia, The Korean Institute of Power Electronics, May 2019, pp. 1213-1220.

* cited by examiner

REDUCED COMMON MODE VOLTAGE PULSE WIDTH MODULATION SWITCHING SCHEME WITH CAPACITOR VOLTAGE BALANCING FOR A MULTILEVEL POWER CONVERTER

PRIORITY INFORMATION

The present application claims priority to Indian Patent Application Number 202311003782 filed on Jan. 19, 2023.

FIELD

The present subject matter relates generally to pulse width modulated switching schemes for multilevel power converters, such as multilevel power converters for aircraft.

BACKGROUND

Hybrid-electric propulsion systems are being developed to improve an efficiency of conventional commercial aircraft. Some hybrid-electric propulsion systems include one or more electric machines each being mechanically coupled with a rotating component of an aircraft engine. The electric machines can each have an associated multilevel power converter electrically coupled thereto. Improved pulse width modulated switching schemes for multilevel power converters would be a welcome addition to the art.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
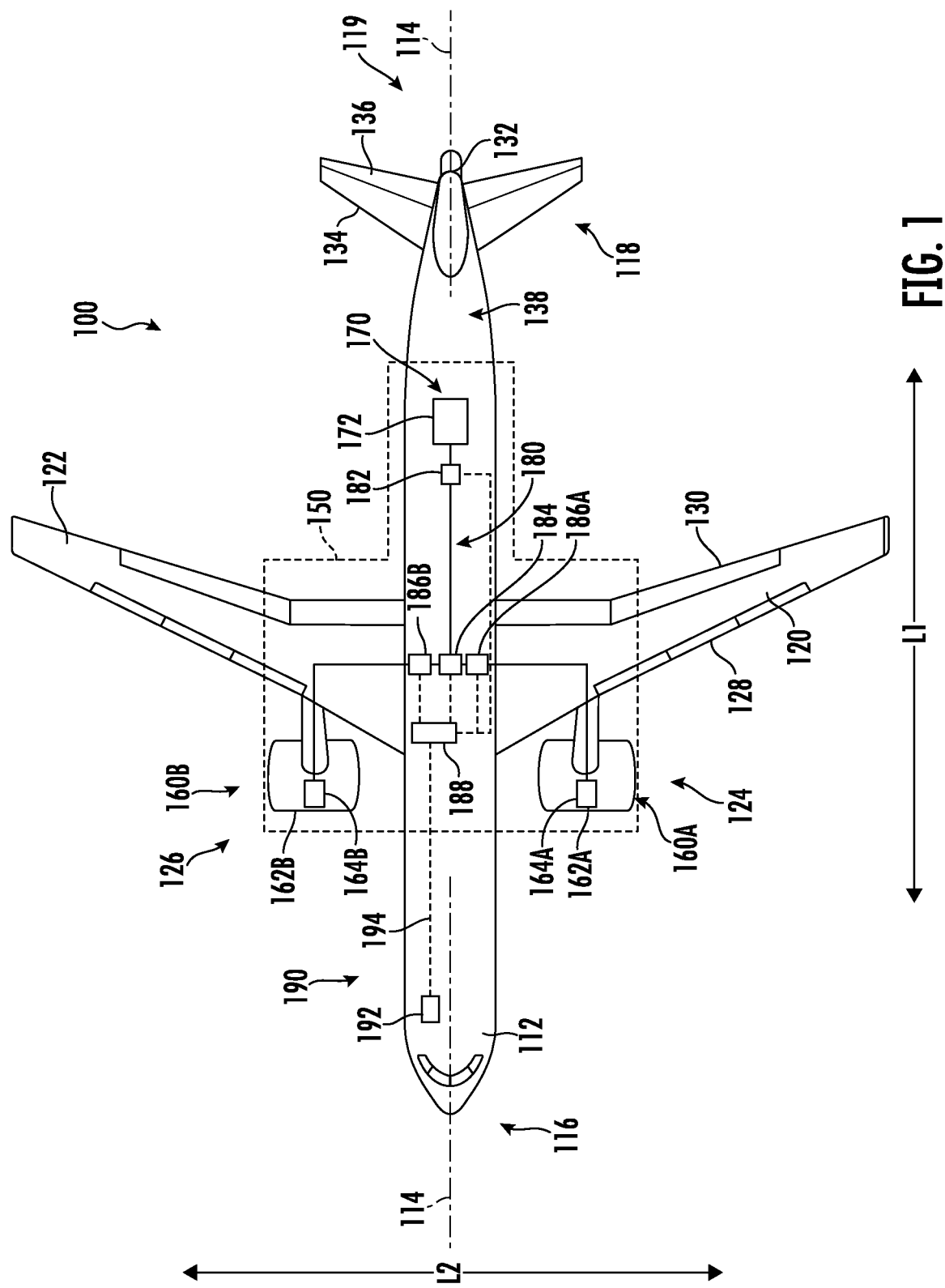
FIG. 1 provides a schematic top view of an aircraft having a hybrid-electric propulsion system according to an example embodiment of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

As used herein, the terms "first", "second", and "third" may be used interchangeably to distinguish one component from another and are not intended to signify location or importance of the individual components.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Electrical power systems, such as those found in aircraft hybrid-electric propulsion systems, can employ an electric machine and an associated multilevel power converter. Due to ever increasing requirements for aviation electrical power systems to increase power distribution voltage, increase power level and consequent emission paths, and utilize efficient high-speed power semiconductors, there is an increased need for mitigation of common mode emissions. Common mode emissions may introduce shaft voltage, bearing currents, and electromagnetic interference.

Some multilevel power converters can be controlled to implement a zero or reduced Common Mode Voltage (CMV) scheme to eliminate or otherwise reduce CMV. While reduced CMV schemes are effective in eliminating or otherwise reducing CMV, implementation of such schemes may present certain challenges, such as voltage imbalance between DC link capacitors of a multilevel power converter. Conventionally, to counteract the imbalance in the voltage across the DC link capacitors, additional hardware has been used to inject electrical power into the system. Additional hardware can add weight and expense to the aircraft, and may take up valuable space therein.

Accordingly, the inventors of the present disclosure have developed Pulse Width Modulated (PWM) switching schemes for multilevel power converters that not only reduce common mode emissions and associated electromagnetic interference in electrical power systems, but may also balance the voltage between DC link capacitors. In accordance with the inventive aspects of the present disclosure, a controller of a multilevel power converter can generate a PWM pulse pattern for a given duty cycle in accordance with a zero or reduced CMV scheme. A voltage error is determined based at least in part on a first voltage across a first DC link capacitor of the multilevel power converter and a second voltage across a second DC link capacitor of the multilevel power converter. The generated PWM pulse pattern is modified so that at least one pulse of a PWM signal of the PWM pulse pattern is adjusted based at least in part on one or more characteristics of the voltage error. In this manner, when switches of the multilevel power converter implement the duty cycle, at least one CMV pulse is rendered or injected into the circuitry of the multilevel power converter and/or electrical power system. The one or more rendered CMV pulses may be used to balance the voltages across the first and second DC link capacitors.

Certain advantages, benefits, and technical effects may be realized by the PWM switching schemes of the present disclosure. For instance, the PWM switching schemes of the present disclosure may facilitate minimal or otherwise reduced CMV in the circuitry of the multilevel power converter and/or electrical power system whilst also achieving DC link capacitor voltage balancing without need or reduced need for extra hardware, such as additional power sources. Thus, the PWM switching schemes of the present disclosure may allow for lighter and smaller packaged systems. Moreover, compared to conventional PWM switching schemes that do not utilize reduced CMV schemes, the electromagnetic interference filter size associated with the multilevel power converter can be significantly reduced. Also, compared to conventional PWM switching schemes that do not utilize reduced CMV schemes, the PWM switching schemes of the present disclosure can eliminate or greatly reduce the challenges associated with CMV, such as shaft voltage, bearing currents, and electromagnetic interference. Other benefits and advantages may be realized as well.

FIG. 1 provides a schematic top view of an aircraft 100 as may incorporate one or more inventive aspects of the present disclosure. As shown in FIG. 1, for reference, the aircraft 100 defines a longitudinal direction L1 and a lateral direction L2. The lateral direction L2 is perpendicular to the longitudinal direction L1. The aircraft 100 also defines a longitudinal centerline 114 that extends therethrough along the longitudinal direction L1. The aircraft 100 extends between a forward end 116 and an aft end 118, e.g., along the longitudinal direction L1.

As depicted, the aircraft 100 includes a fuselage 112 that extends longitudinally from the forward end 116 to the aft end 118 of the aircraft 100. The aircraft 100 also includes an empennage 119 at its aft end 118. In addition, the aircraft 100 includes a wing assembly including a first, port side wing 120 and a second, starboard side wing 122. The first and second wings 120, 122 each extend laterally outward from the fuselage 112 with respect to the longitudinal centerline 114. The first wing 120 and a portion of the fuselage 112 together define a first side 124 of the aircraft 100 and the second wing 122 and another portion of the fuselage 112 together define a second side 126 of the aircraft 100. For the embodiment depicted, the first side 124 of the aircraft 100 is configured as the port side of the aircraft 100 and the second side 126 of the aircraft 100 is configured as the starboard side of the aircraft 100.

The aircraft 100 includes various control surfaces. In the embodiment of FIG. 1, each wing 120, 122 includes one or more leading edge flaps 128 and one or more trailing edge flaps 130. The aircraft 100 further includes, or more specifically, the empennage 119 of the aircraft 100 includes a vertical stabilizer 132 having a rudder flap (not shown) for yaw control and a pair of horizontal stabilizers 134 each having an elevator flap 136 for pitch control. The fuselage 112 additionally includes an outer surface or skin 138. It should be appreciated that, in other exemplary embodiments of the present disclosure, the aircraft 100 may additionally or alternatively include any other suitable configuration. For example, in other embodiments, the aircraft 100 may include any other control surface configuration.

The aircraft 100 of FIG. 1 also includes a hybrid-electric propulsion system 150. For this embodiment, the hybrid-electric propulsion system 150 has a first propulsor 160A and a second propulsor 160B both operable to produce thrust. The first propulsor 160A is mounted to the first wing 120 and the second propulsor 160B is mounted to the second wing 122. For the embodiment depicted, the first propulsor 160A and second propulsor 160B are each configured in an underwing-mounted configuration. However, in other example embodiments, one or both of the first and second propulsors 160A, 160B may be mounted at any other suitable location, such as directly to the fuselage 112 aft of the wings 120, 122.

The first propulsor 160A includes a first gas turbine engine 162A and one or more electric machines, such as a first electric machine 164A mechanically coupled with the gas turbine engine 162A. The first electric machine 164A can be directly mechanically coupled to a shaft of the first gas turbine engine 162A or indirectly via a gearbox, for example. The first electric machine 164A can be an electric generator, an electric motor, or a combination generator/motor. For this example embodiment, the first electric machine 164A is a combination generator/motor. In this manner, when operating as an electric generator, the first electric machine 164A can generate electrical power when driven by the gas turbine engine 162A. When operating as an electric motor, the first electric machine 164A can drive or motor the first gas turbine engine 162A. The first gas turbine engine 162A can be any suitable type of gas turbine engine, including a turbofan, turbojet, turboprop, turboshaft, etc.

Likewise, the second propulsor 160B includes a second gas turbine engine 162B and one or more electric machines, such as a second electric machine 164B mechanically coupled with the second gas turbine engine 162B. The second electric machine 164B can be directly mechanically coupled to a shaft of the second gas turbine engine 162B or indirectly via a gearbox, for example. The second electric machine 164B can be an electric generator, an electric motor, or a combination generator/motor. For this example embodiment, the second electric machine 164B is a combination generator/motor. In this manner, when operating as an electric generator, the second electric machine 164B can generate electrical power when driven by the gas turbine engine 162B. When operating as an electric motor, the second electric machine 164B can drive or motor a spool of the gas turbine engine 162B. The second electric machine 164B can be configured and can operate in a similar manner as first electric machine 164A described herein. The second gas turbine engine 162B can be any suitable type of gas turbine engine, including a turbofan, turbojet, turboprop, turboshaft, etc.

The hybrid-electric propulsion system 150 further includes an electric energy storage system 170. The electric energy storage system 170 can include one or more electric energy storage devices, such as batteries, supercapacitor arrays, one or more ultracapacitor arrays, some combination of the foregoing, etc. For instance, in the embodiment of FIG. 1, the electric energy storage system 170 includes a battery 172. The battery 172 is electrically coupled with a DC/DC converter 182 or voltage-regulating power supply. In some embodiments, the DC/DC converter 182 can be a bidirectional DC/DC converter. In this regard, the DC/DC converter 182 can control the electrical power drawn from the battery 172 and the electrical power provided to the battery 172 depending on whether it is desired to discharge or charge the battery 172. The DC/DC converter 182 is electrically coupled with a power bus 180.

A power distribution unit 184 is positioned along the power bus 180. The power distribution unit 184 can be controlled to distribute electrical power to various loads of the aircraft 100. For instance, electrical power drawn from the battery 172 can be directed to the power distribution unit 184 across the power bus 180, and the power distribution unit 184 can distribute the electrical power to various aircraft loads, such as the first electric machine 164A and/or the second electric machine 164B. A first alternating current/direct current (AC/DC) converter 186A (or first DC/AC converter) associated with the first electric machine 164A can be positioned along the power bus 180 for converting direct current into alternating current or vice versa. Similarly, a second AC/DC converter 186B (or second DC/AC converter) associated with the second electric machine 164B can be positioned along the power bus 180 for converting direct current into alternating current or vice versa. The first AC/DC converter 186A and the second AC/DC converter 186B can both be bidirectional converters. In other embodiments, the first and second AC/DC converters 186A, 186B can be unidirectional converters configured to convert direct current into alternating current or vice versa. The first and second AC/DC converters 186A, 186B can both be configured in a same or similar as the multilevel power converter 200 of FIG. 2 and can implement the PWM switching schemes disclosed herein.

The power distribution unit 184 and other devices of the hybrid-electric propulsion system 150 can be managed by a power management system. The power management system can include a supervisor controller 188 operable to control or provide data to the power distribution unit 184, a controller of the DC/DC converter 182, respective controllers of the first and second AC/DC converters 186A, 186B, among other elements. The controllers of the converters 182, 186A, 186B are operable to receive inputs (e.g., voltage commands) from the supervisor controller 188, and based on such inputs, the controllers can cause switches of the converters 182, 186A, 186B to perform duty cycles, for example.

As further shown in FIG. 1, the supervisor controller 188 can form a part of a computing system 190 of the aircraft 100. The computing system 190 of the aircraft 100 can include one or more processors and one or more memory devices embodied in one or more computing devices. For instance, as depicted in FIG. 1, the computing system 190 includes the supervisor controller 188 as well as other computing devices, such as computing device 192. The computing system 190 can include other computing devices as well, such as engine controllers (not shown), controllers associated with each converter 182, 186A, 186B, etc. The computing devices of the computing system 190 can be communicatively coupled with one another via a communication network. For instance, computing device 192 is located in the cockpit of the aircraft 100 and is communicatively coupled with the supervisor controller 188 of the hybrid-electric propulsion system 150 via a communication link 194 of the communication network. The communication link 194 can include one or more wired or wireless communication links.

For this embodiment, the computing device 192 is configured to receive and process inputs, e.g., from a pilot or other crew members, and/or other information. In this manner, as one example, the one or more processors of the computing device 192 can receive an input indicating a command to change a thrust output of the first and/or second propulsors 160A, 160B. In response to the input, the supervisor controller 188 can manage the electrical power drawn from the battery 172 by controlling or providing data to the controller of the DC/DC converter 182, as well as managing the power distribution unit 184 and AC/DC converters 186A, 186B to distribute and supply the electrical power needed to meet the power demands of the electric machines 164A, 164B. In this way, the electric machines 164A, 164B can drive their respective gas turbine engines 162A, 162B to ultimately change the thrust output of one or both of the propulsors 160A, 160B.

The supervisor controller 188 and other computing devices of the computing system 190 of the aircraft 100 may be configured in the same or substantially the same manner as the exemplary computing devices of the computing system 600 described below with reference to FIG. 16.

While the aircraft 100 depicted in FIG. 1 includes the hybrid-electric propulsion system 150, it will be appreciated that the inventive aspects of the present disclosure can apply equally to fully electric propulsion systems. Moreover, the inventive aspects of the present disclosure can apply to other electrical power systems outside of the aviation industry that involve power converters.

Figure 2:
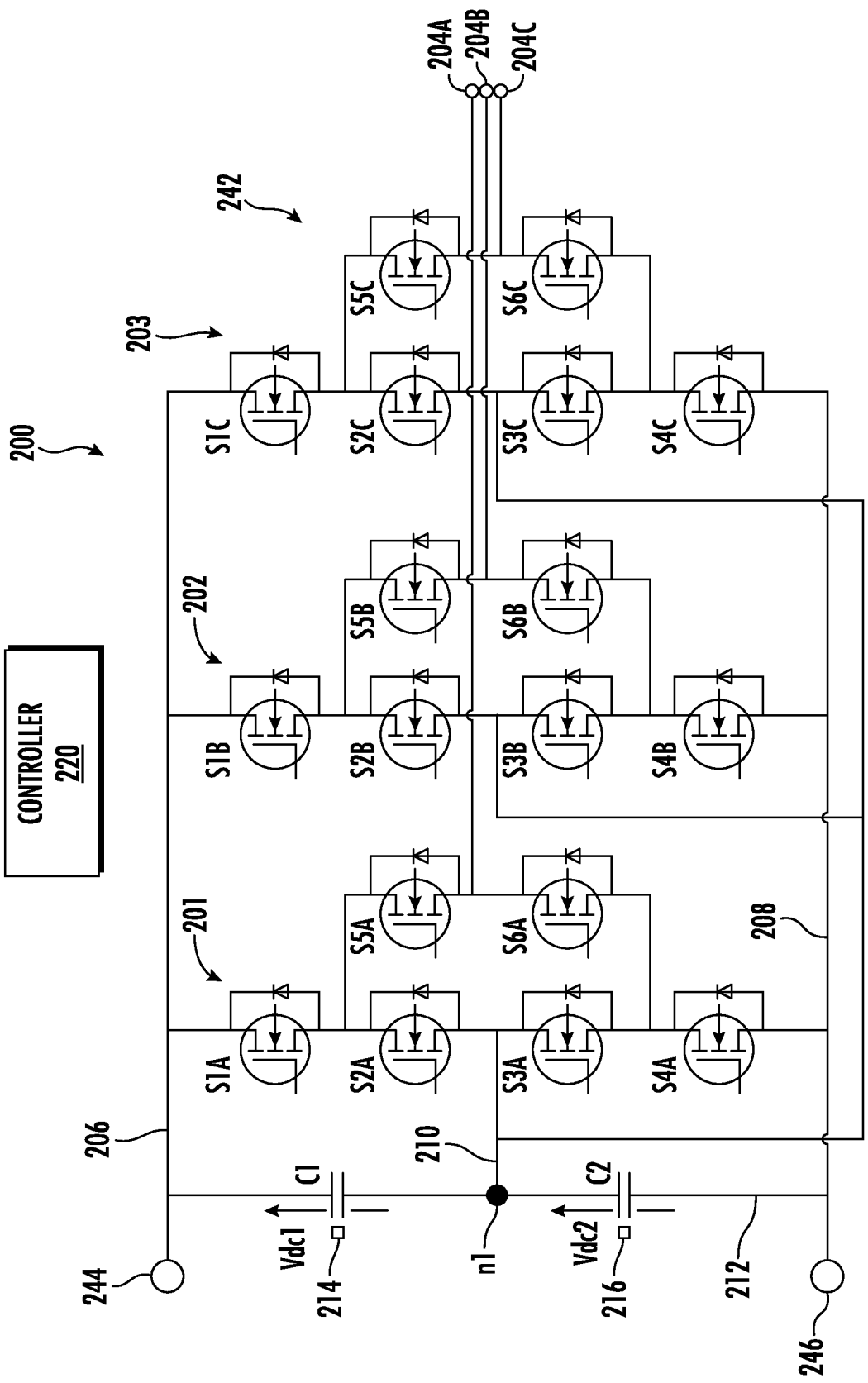
FIG. 2 provides a circuit diagram of a multilevel power converter according to an example embodiment of the present disclosure.

FIG. 2 provides a circuit diagram of a multilevel power converter 200 according to one example embodiment of the present disclosure. For this embodiment, the multilevel power converter 200 is a three-level power converter. The multilevel power converter 200 has three legs. Each leg is associated with a different phase A, B, C. Particularly, as shown, a first leg 201 of the multilevel power converter 200 is electrically coupled with an A-phase terminal 204A, e.g., of an electric machine. Thus, the first leg 201 is associated with an A phase. A second leg 202 of the multilevel power converter 200 is electrically coupled with a B-phase terminal 204B, e.g., of the electric machine. Hence, the second leg 202 is associated with a B phase. A third leg 203 of the multilevel power converter 200 is electrically coupled with a C-phase terminal 204C, e.g., of the electric machine. Accordingly, the third leg 203 is associated with a C phase. Each leg 201, 202, 203 spans between a first rail 206 and a second rail 208. A mid rail 210 electrically couples each leg 201, 202, 203.

Each leg 201, 202, 203 has a plurality of switches 242. Specifically, the first leg 201 has six (6) switches S1A, S2A, S3A, S4A, S5A, and S6A. The mid rail 210 is electrically coupled to the first leg 201 between switches S2A and S3A as shown in FIG. 2. Like the first leg 201, the second leg 202 has six (6) switches S1B, S2B, S3B, S4B, S5B, and S6B. The mid rail 210 is electrically coupled to the second leg 202 between switches S2B and S3B as depicted. Similarly, the third leg 203 has six (6) switches S1C, S2C, S3C, S4C, S5C, and S6C. The mid rail 210 is electrically coupled to the third leg 203 between switches S2C and S3C as illustrated. The switches 242 (or S1A-S6A, S1B-S6B, S1C-S6C) of the multilevel power converter 200 can be any suitable type of switches, such as insulated gate bipolar transistors, power MOSFETs, etc.

Figure 3:
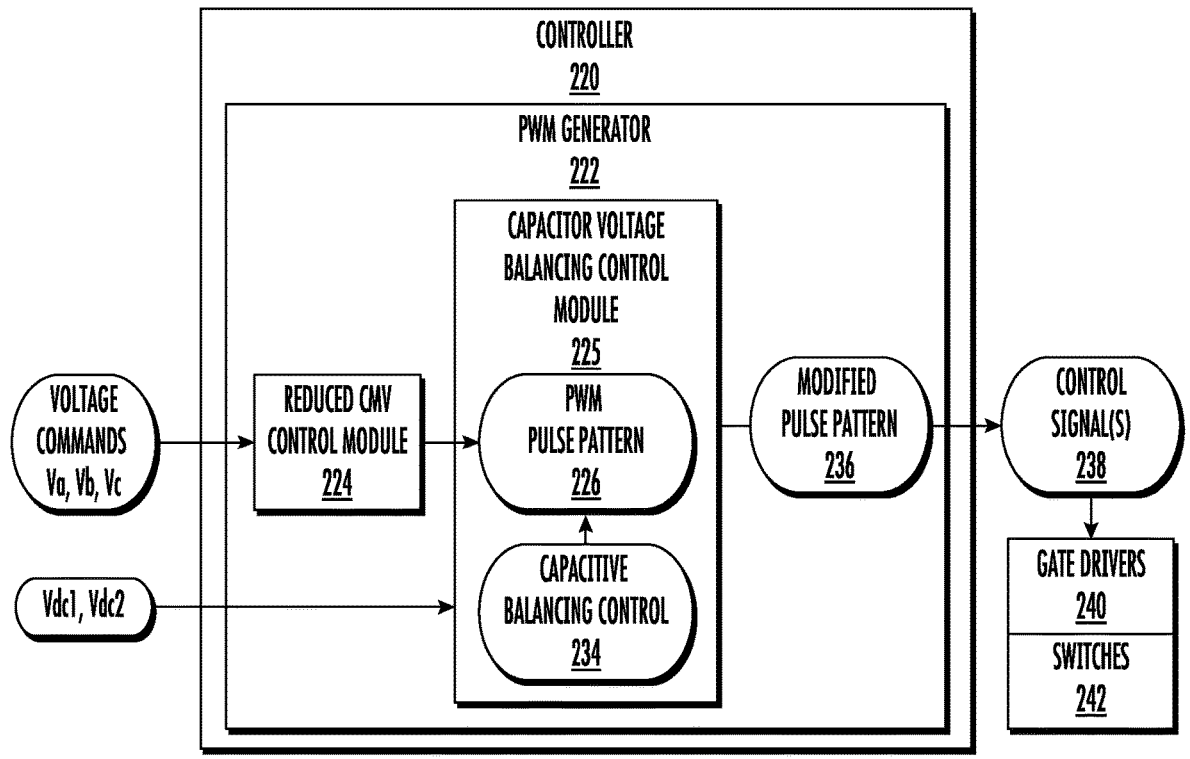
FIG. 3 provides a flow diagram for implementing a pulse width modulated (PWM) switching scheme according to an example embodiment of the present disclosure.

The switches 242 of the multilevel power converter 200 can be switched or modulated by one or more controllable devices to regulate the electrical power through the multilevel power converter 200. For instance, the switches 242 of the multilevel power converter 200 can be controlled by one or more associated gate drivers 240 (FIG. 3). The one or more gate drivers 240 can be controlled to drive or modulate their respective switches 242. In some embodiments, each switch of the multilevel power converter 200 has an associated gate driver. In other embodiments, multiple switches can be driven by a single gate driver. By turning on or off the switches 242 electrical power through the multilevel power converter 200 can be controlled.

A first DC link capacitor C1 and a second DC link capacitor C2 are positioned along a DC link 212. The DC link 212 is electrically coupled with the first rail 206 and the second rail 208 as depicted in FIG. 2. The mid rail 210 is electrically coupled with the DC link 212 between the first DC link capacitor C1 and the second DC link capacitor C2 at a midpoint node n1. During operation of the multilevel power converter 200, the first DC link capacitor C1 has a first voltage Vdc1 associated therewith. The first voltage Vdc1 is taken as the voltage across the first DC link capacitor C1. Similarly, during operation, the second DC link capacitor C2 has a second voltage Vdc2 associated therewith. The second voltage Vdc2 is taken as the voltage across the second DC link capacitor C2. In some instances, the first voltage Vdc1 may be greater than the second voltage Vdc2. In other instances, the second voltage Vdc2 may be greater than the first voltage Vdc1.

The switches S1A, S2A, S5A of the first leg 201, the switches S1B, S2B, S5B of the second leg 202, the switches S1C, S2C, S5C of the third leg 203, the first rail 206, and the first DC link capacitor C1 collectively form a first bus structure of the multilevel power converter 200. The switches S3A, S4A, S6A of the first leg 201, the switches S3B, S4B, S6B of the second leg 202, the switches S3C, S4C, S6C of the third leg 203, the second rail 208, and the second DC link capacitor C2 collectively form a second bus structure of the multilevel power converter 200. The mid rail 210 delineates the first and second bus structures of the multilevel power converter 200. A first terminal 244 and a second terminal 246 of the multilevel power converter 200 can be electrically coupled with a DC bus.

The multilevel power converter 200 can also include one or more sensors. The sensors can sense various characteristics or properties of the electrical power at certain locations within the multilevel power converter 200. For instance, the multilevel power converter 200 can include one or more sensors operable to measure a voltage and/or current at their respective locations. For the depicted embodiment of FIG. 2, the multilevel power converter 200 includes a first sensor 214 associated with the first DC link capacitor C1 and a second sensor 216 associated with the second DC link capacitor C2. The first sensor 214 can sense the first voltage Vdc1, or voltage across the first DC link capacitor C1. The second sensor 216 can sense the second voltage Vdc2, or voltage across the second DC link capacitor C2. The multilevel power converter 200 can also include other sensors positioned at other suitable locations.

The multilevel power converter 200 can include one or more processors and one or more memory devices. The one or more processors and one or more memory devices can be embodied in one or more controllers or computing devices. For instance, for the embodiment shown in FIG. 2, the one or more processors and one or more memory devices are embodied in a controller 220. The controller 220 can be communicatively coupled with various devices, such as the gate drivers 240 associated with the switches 242, the one or more sensors 214, 216, other computing devices (such as the supervisor controller 188 depicted in FIG. 1), as well as other electronic devices. The controller 220 can be communicatively coupled with such devices via a suitable wired and/or wireless connection. Generally, the controller 220 can be configured in the same or substantially the same manner as the example computing devices of the computing system 600 described with reference to FIG. 16.

Figure 4:
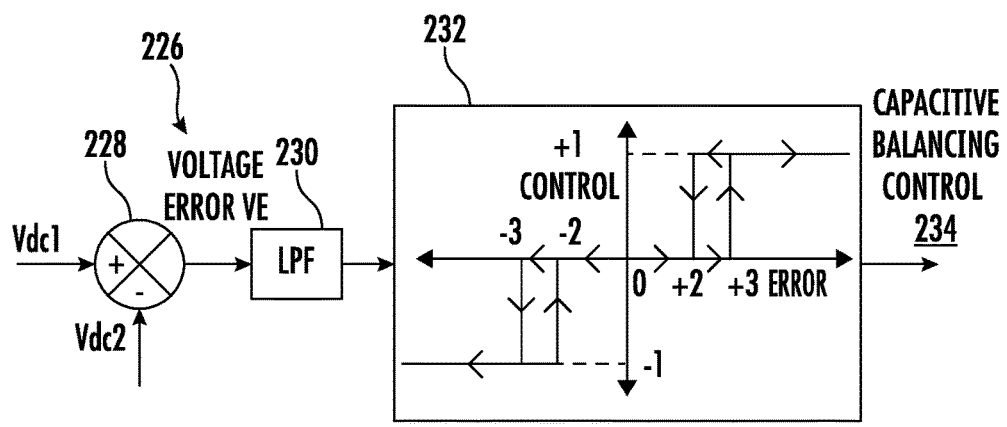
FIG. 4 provides a logic diagram for implementing a capacitor voltage balancing scheme that may be used in implementing the PWM switching scheme of FIG. 3.

With reference now to FIGS. 2, 3, and 4, FIG. 3 provides a flow diagram for implementing a Pulse Width Modulated (PWM) switching scheme according to an example embodiment of the present disclosure. FIG. 4 provides a logic diagram for implementing a capacitor voltage balancing scheme that may be used in implementing the PWM switching scheme shown in FIG. 3.

As depicted, the controller 220 of the multilevel power converter 200 includes a pulse width modulated generator, or PWM generator 222. The PWM generator 222 can include computer-readable or computer-executable instructions, control logic, or algorithms stored on one or more memory devices of the controller 220. Particularly, as shown in FIG. 3, the PWM generator 222 includes a reduced common mode voltage control module, or reduced CMV control module 224. The PWM generator 222 also includes a capacitor voltage balancing control module 225. The reduced CMV control module 224 and the capacitor voltage balancing control module 225 can be standalone instructions, control logic, or algorithms as shown in FIG. 3. Alternatively, the reduced CMV control module 224 and the capacitor voltage balancing control module 225 can be integrated into a single set of instructions, control logic, or algorithm in some example embodiments.

When the reduced CMV control module 224 is executed, the one or more processors of the controller 220 can generate a pulse width modulated pulse pattern, or PWM pulse pattern 226, in accordance with a reduced common mode voltage scheme, or reduced CMV scheme. Particularly, as shown in FIG. 3, the PWM generator 222 of the controller 220 can receive voltage commands Va, Vb, Vc. The voltage commands Va, Vb, Vc can each be associated with the first, second, and third phases A, B, and C, respectively. The voltage commands Va, Vb, Vc can be generated by the controller 220 itself, e.g., based on a voltage command from the supervisor controller 188 of FIG. 1, a thrust output, etc., or by another suitable computing device. The voltage commands Va, Vb, Vc can be input into the reduced CMV control module 224, and when executed, the one or more processors of the controller 220 can generate the PWM pulse pattern 226 based at least in part on the voltage commands Va, Vb, Vc. A zero or reduced CMV scheme can be utilized to generate the PWM pulse pattern 226.

Figure 5:
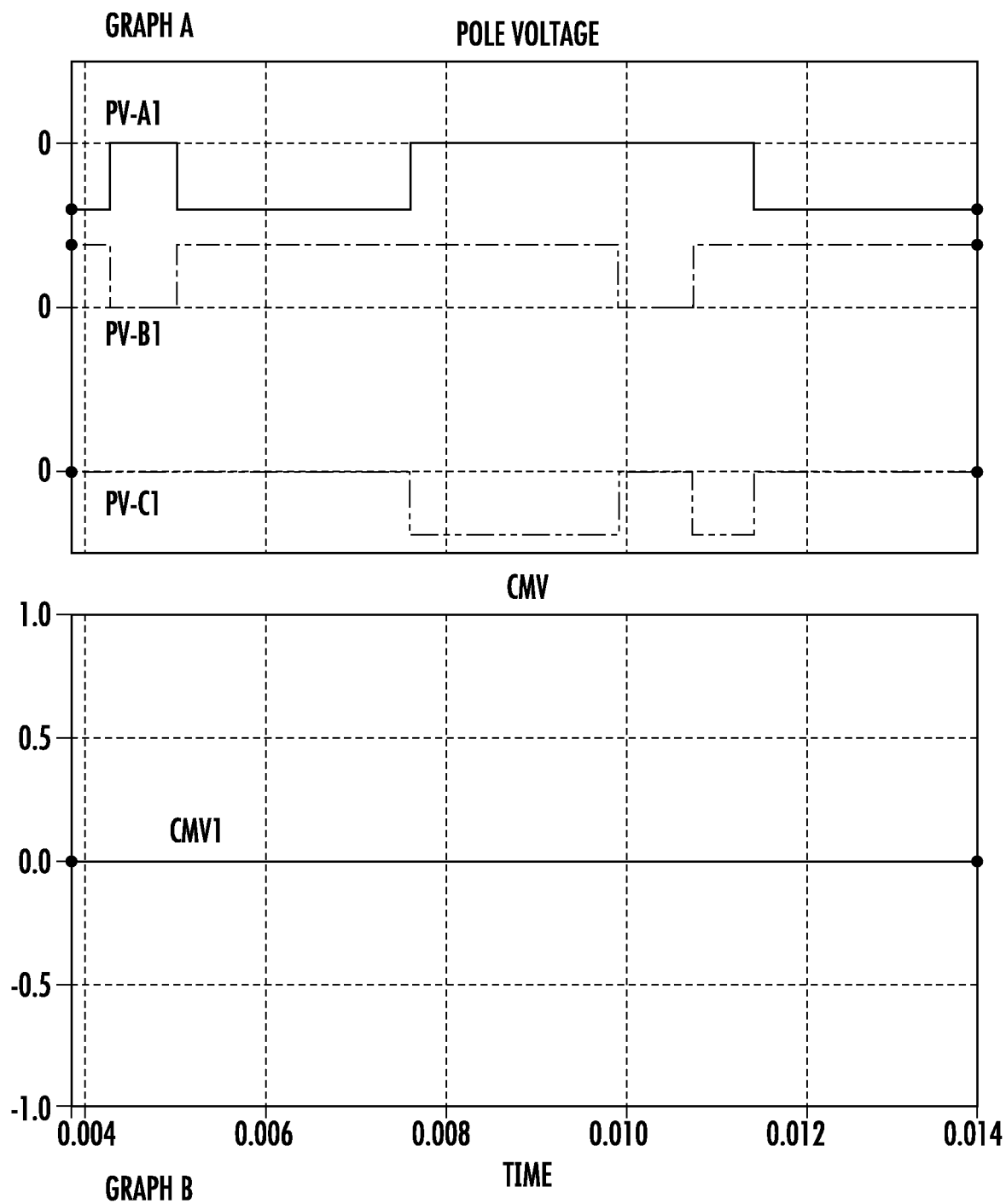
FIG. 5 graphically depicts pole voltages resulting from implementation of a PWM pulse pattern generated in accordance with a reduced Common Mode Voltage (CMV) scheme, as well as a resulting CMV signal.

FIG. 5 provides a timing diagram for one example implementation of a PWM pulse pattern generated in accordance with a reduced CMV scheme for a given duty cycle, as well as a CMV signal that corresponds to the PWM pulse pattern. Particularly, in FIG. 5, two graphs are provided. Graph A depicts pole voltages for each power phase resulting from implementation of a PWM pulse pattern for a given duty cycle as a function of time. A first pole voltage PV-A1 associated with a first phase A can be generated based on implementation of a first PWM signal of the PWM pulse pattern, a second pole voltage PV-B1 associated with a second phase B can be generated based on implementation of a second PWM signal of the PWM pulse pattern, and a third pole voltage PV-C1 associated with a third phase C can be generated based on implementation of a third PWM signal of the PWM pulse pattern.

Graph B of FIG. 5 depicts the corresponding CMV signal CMV1 as a function of time. For a given instance in time, the amplitude of the CMV signal CMV1 is an average amplitude of the pole voltages PV-A1, PV-B1, PV-C1. Stated mathematically, the CMV signal CMV1 is defined as CMV1=(PV-A1+PV-B1+PV-C1)/3. The time scale is the same for both Graph A and Graph B of FIG. 5.

Notably, the pole voltages PV-A1, PV-B1, PV-C1 resulting from implementation of the PWM pulse pattern in FIG. 5 are generated, e.g., by execution of the reduced CMV control module 224, so that the rendered CMV signal CMV1 is zero or otherwise negligible. This is accomplished by timing the pulses and setting the widths of the pulses of the first, second, and third PWM signals so that the net magnitude of the resulting pole voltage at any given time is zero.

For instance, between time 0.004 and time 0.006, the first pole voltage PV-A1 transitions from −1 to 0 and then back to −1. During this same time period, the second pole voltage PV-B1 transitions from 1 to 0 and then back to 1, thereby mirroring the first pole voltage PV-A1. The third pole voltage PV-C1 is held at 0 during this time period. Accordingly, between time 0.004 and time 0.006, the net magnitude of the pole voltages PV-A1, PV-B1, PV-A1 is zero. The net magnitude throughout the rest of the duty cycle is held at zero. Hence, the CMV signal CMV1 in Graph B is a straight line, constant function.

Reducing CMV in the circuitry of the multilevel power converter 200 and the electrical power system associated therewith may be beneficial. For instance, CMV can produce shaft voltage, bearing currents, and electromagnetic interference. However, eliminating CMV completely may bring about other challenges, such as balancing the DC link capacitor voltage. Accordingly, the PWM generator 222 includes the capacitor voltage balancing control module 225 to facilitate "injecting" or "inserting" one or more CMV pulses into the circuitry of the multilevel power converter 200 and/or associated electrical system as will be explained more fully below.

As shown in FIGS. 2, 3, and 4, the one or more processors of the controller 220 can receive a first voltage Vdc1 associated with the first DC link capacitor C1 and a second voltage Vdc2 associated with the second DC link capacitor C2. The first voltage Vdc1 and the second voltage Vdc2 can be input into a summation block 228 as shown in FIG. 4. The one or more processors can execute the summation block 228 of the capacitor voltage balancing control module 225 to determine a voltage error VE based at least in part on the first voltage Vdc1 and the second voltage Vdc2. For this example, the second voltage Vdc2 can be subtracted from the first voltage Vdc1 to determine the voltage error VE. In other example embodiments, the first voltage Vdc1 can be subtracted from the second voltage Vdc2 to determine the voltage error VE. One or more characteristics can be associated with the voltage error VE. For instance, the voltage error VE can have a magnitude and a polarity (the voltage error VE can be positive or negative) associated therewith.

The determined voltage error VE can be passed through a low-pass filter 230 to a control block 232 of the capacitor voltage balancing control module 225. Depending on one or more characteristics of the voltage error VE, such as the magnitude and polarity of the voltage error VE, the one or more processors can execute the control block 232 to determine a capacitive balancing control 234. The capacitive balancing control 234 can indicate instructions for modifying the PWM pulse pattern 226 generated by the reduced CMV control module 224. Specifically, the capacitive balancing control 234 can indicate instructions for adjusting at least one pulse of at least one PWM signal of the PWM pulse pattern 226 based at least in part on one or more characteristics of the voltage error VE, such as the magnitude and polarity of the voltage error VE. When the PWM pulse pattern 226 is modified by the capacitive balancing control 234, a modified pulse pattern 236 is rendered as shown in FIG. 3. Accordingly, the modified pulse pattern 236 is a modified version of the PWM pulse pattern 226.

The one or more processors of the controller 220 can generate one or more control signals 238 based at least in part on the modified pulse pattern 236. The one or more control signals 238 can be routed to one or more gate drivers 240 associated with the switches 242. The one or more gate drivers 240 can cause the switches 242 to switch in accordance with the modified pulse pattern 236, or, in some instances, the PWM pulse pattern 226. Accordingly, the one or more processors of the controller 220 can cause the plurality of switches 242 to implement a duty cycle based at least in part on the modified pulse pattern 236, or, in some instances, the PWM pulse pattern 226.

Notably, modulating the switches 242 in accordance with the modified pulse pattern 236 renders at least one common mode voltage pulse, or CMV pulse. That is, modulating the switches 242 in accordance with the modified pulse pattern 236 causes one or more CMV pulses to be "inserted" or "injected" into the circuitry of the multilevel power converter 200 and/or the electrical system associated therewith.

Figure 6:
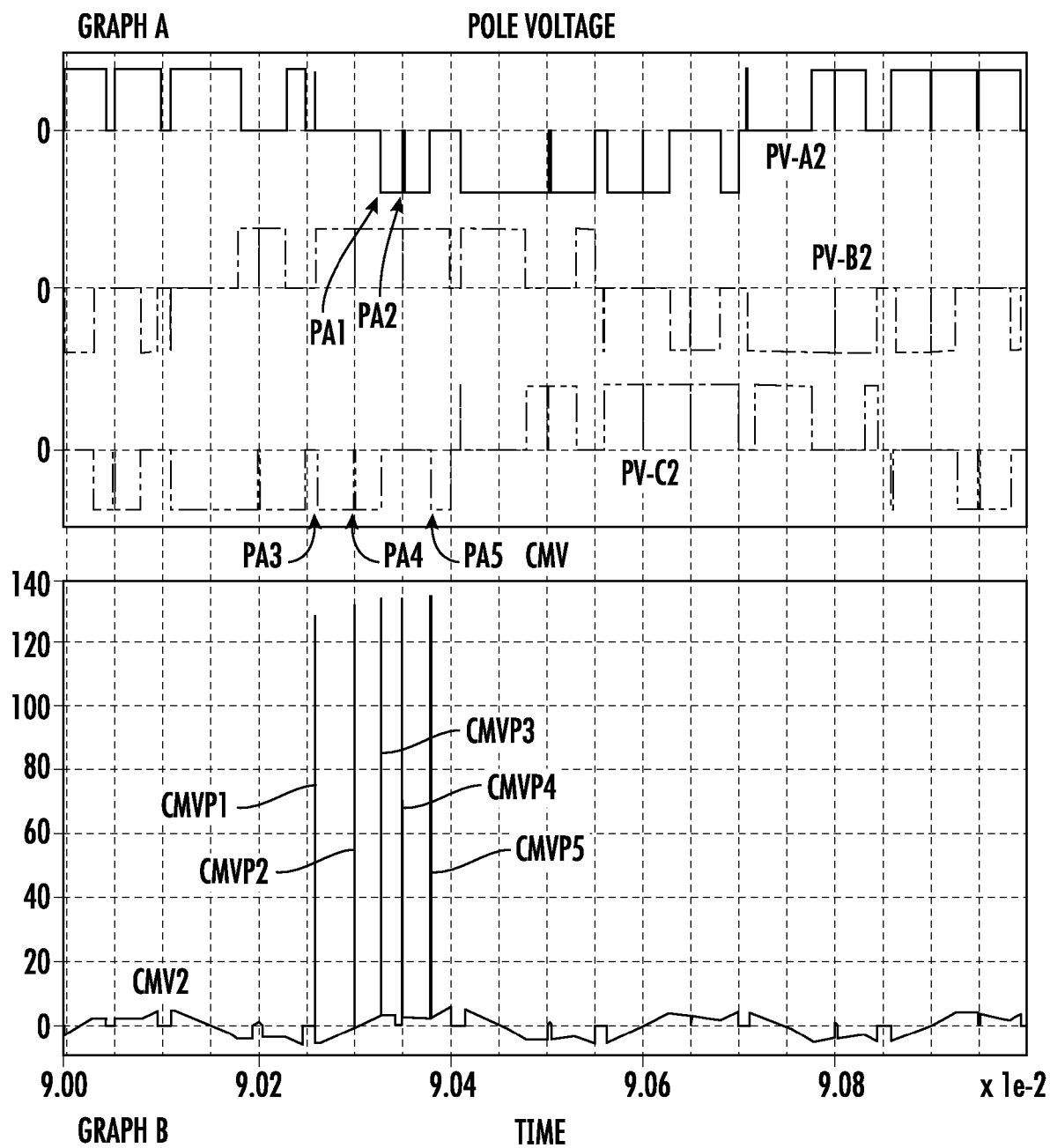
FIG. 6 graphically depicts pole voltages resulting from implementation of a modified PWM pulse pattern generated in accordance with a reduced CMV scheme in tandem with a capacitor voltage balancing scheme, as well as a resulting CMV signal.

As one example, FIG. 6 provides a timing diagram for one example implementation of a modified pulse pattern generated using a reduced CMV scheme in tandem with a capacitor voltage balancing scheme in accordance with the inventive aspects of the present disclosure, as well as a CMV signal that corresponds to the modified PWM pulse pattern. Particularly, FIG. 6 depicts two graphs, including Graph A and Graph B.

Graph A of FIG. 6 graphically depicts pole voltages for each power phase resulting from implementation of a modified pulse pattern generated using a reduced CMV scheme in tandem with a capacitor voltage balancing scheme. Specifically, Graph A depicts pole voltages for each power phase resulting from implementation of the modified pulse pattern for various duty cycles as a function of time. The duty cycles are delineated by the vertical dashed lines. A first pole voltage PV-A2 associated with a first phase A can be generated based on implementation of a first PWM signal of the modified PWM pulse pattern, a second pole voltage PV-B2 associated with a second phase B can be generated based on implementation of a second PWM signal of the modified PWM pulse pattern, and a third pole voltage PV-C2 associated with a third phase C can be generated based on implementation of a third PWM signal of the modified PWM pulse pattern.

Graph B depicts the corresponding CMV signal CMV2 as a function of time. For a given instance in time, the amplitude of the CMV signal CMV2 is an average amplitude of the pole voltages PV-A2, PV-B2, PV-C2. Stated mathematically, the CMV signal CMV2 is defined as CMV2=(PV-A2+PV-B2+PV-C2)/3. The time scale is the same for both Graph A and Graph B of FIG. 6.

In accordance with the inventive aspects of the present disclosure, one or more of the PWM signals of the modified PWM pulse pattern can be adjusted, e.g., based at least in part on one or more characteristics of the voltage error. As a result, one or more pulses of the pole voltages can be adjusted. For instance, as shown in Graph A of FIG. 6, certain pulses of the first pole voltage PV-A2 and the third pole voltage PV-C2 have been adjusted, e.g., as a result of the first PWM signal and the third PWM signal being adjusted or otherwise modified by the capacitor voltage balancing scheme. The adjusted pulses are noted by PA1, PA2, PA3, PA4, and PA5 in Graph A of FIG. 6. Notably, these adjustments render various CMV pulses in the CMV signal CMV2, denoted as CMVP1, CMVP2, CMVP3, CMVP4, and CMVP5 in Graph B of FIG. 6. As shown, a single CMV pulse can be injected into a given duty cycle or multiple CMV pulses can be injected. The number of CMV pulses injected into a given duty cycle can be controlled. The width of each CMV pulse can also be controlled. As illustrated in Graph B of FIG. 6, the CMV signal CMV2 is relatively constant over time due to implementation of the reduced CMV scheme, but also includes intelligently injected CMV pulses CMVP1, CMVP2, CMVP3, CMVP4, and CMVP5.

Such injected CMV pulses may effectively balance the first voltage Vdc1 across the first DC link capacitor C1 and the second voltage Vdc2 across the second DC link capacitor C2. For instance, the voltages at the first DC link capacitor C1 and at the second DC link capacitor C2 can be balanced so that the voltages are substantially equal (e.g., within fifteen percent (15%) of one another) or equal to one another. While purposefully inserting one or more CMV pulses into the circuitry of the multilevel power converter 200 goes against the objective of the reduced CMV scheme, the inventors of the present disclosure have discovered that intelligently inserting one or more CMV pulses may render improved DC link capacitor balancing with zero or minimal distortion to differential mode signals.

Figure 7:
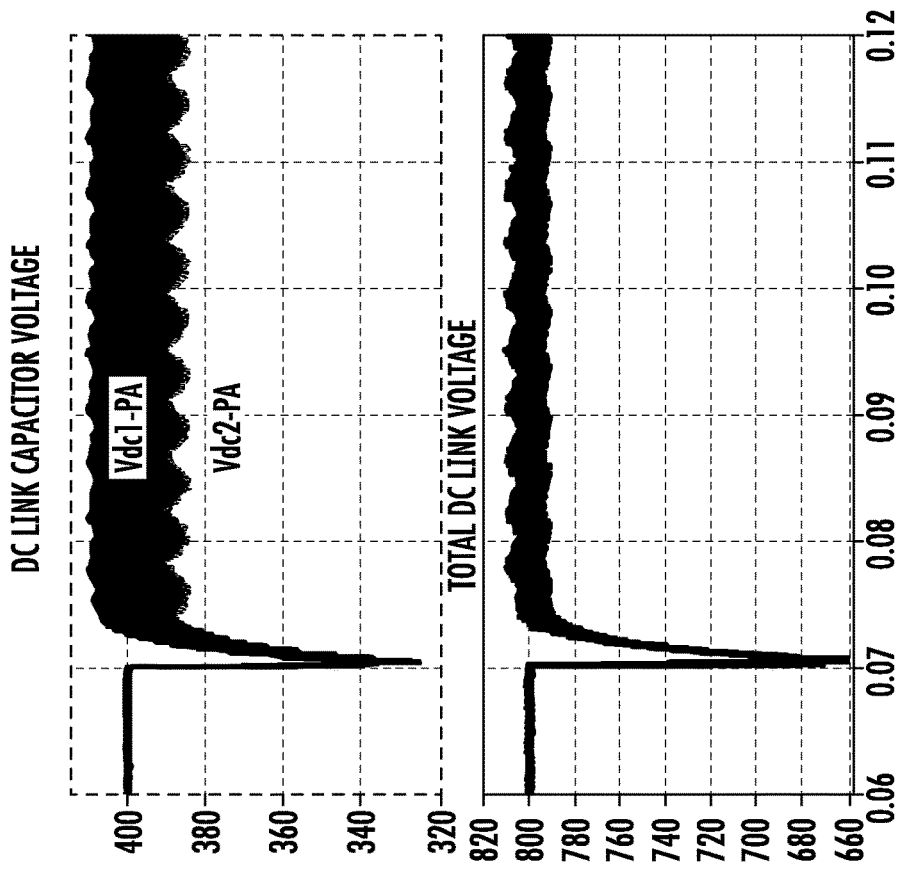
FIG. 7 depicts, without implementation of a capacitor voltage balancing scheme, a first voltage across a first direct (DC) link capacitor and a second voltage across a second DC link capacitor as a function of time, as well as a total DC link voltage as a function of time.
Figure 8:
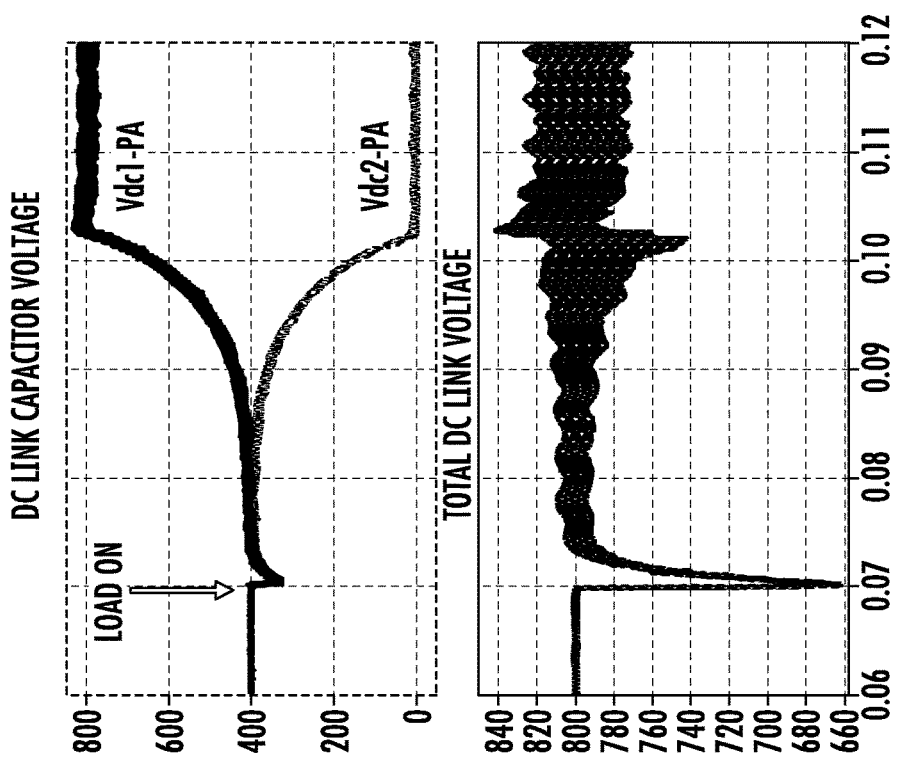
FIG. 8 depicts, with implementation of a capacitor voltage balancing scheme, a first voltage across a first DC link capacitor and a second voltage across a second DC link capacitor as a function of time, as well as a total DC link voltage as a function of time.

For instance, with reference to FIGS. 7 and 8, FIG. 7 provides two graphs. Graph A of FIG. 7 depicts a first voltage Vdc1-PA across a first DC link capacitor and a second voltage Vdc2-PA across a second DC link capacitor as a function of time. Graph B of FIG. 7 depicts a total DC link voltage as a function of time. The time scale in Graph A and Graph B of FIG. 7 are the same. In Graph A and Graph B of FIG. 7, implementation of a reduced CMV scheme is implemented without the capacitor voltage balancing scheme noted above. Accordingly, when a load is applied at time 0.07, it is apparent that the first voltage Vdc1-PA and the second voltage Vdc2-PA diverge significantly. There is also significant transients in the total DC link voltage just after time 0.10, and the amplitude of the total DC link voltage is relatively high after time 0.10 when the first voltage Vdc1-PA and the second voltage Vdc2-PA reach their respective steady-state levels after time 0.10. This can cause distress pole voltage on the AC side of the multilevel power converter 200, e.g., the capacitors will be subject to Vdc rather than Vdc/2, among other drawbacks. Conventionally, to counteract these negative effects and to balance the voltage across the DC link capacitors, additional hardware has been used.

FIG. 8 provides two graphs as well. Graph A of FIG. 8 depicts the first voltage Vdc1 across the first DC link capacitor C1 (FIG. 2) and the second voltage Vdc2 across the second DC link capacitor C2 (FIG. 2) as a function of time. Graph B of FIG. 8 depicts a total DC link voltage as a function of time. The time scale in Graph A and Graph B of FIG. 8 are the same. In Graph A and Graph B of FIG. 8, implementation of a reduced CMV scheme is implemented along with the capacitor voltage balancing scheme noted above, which when implemented, intelligently inserts CMV pulses in the circuitry of the multilevel power converter 200. Accordingly, when a load is applied at time 0.07, it is apparent that the first voltage Vdc1 and the second voltage Vdc2 do not diverge significantly as in Graph A of FIG. 7; rather, they become synchronized or substantially synchronized. As shown in Graph B of FIG. 8, the total DC link voltage is maintained relatively consistently just after the load is applied at time 0.07 and as time progresses. There are no significant transients and the amplitude of the total DC link voltage is relatively low compared to the total DC link voltage shown in Graph B of FIG. 7 after time 0.10.

Figure 9:
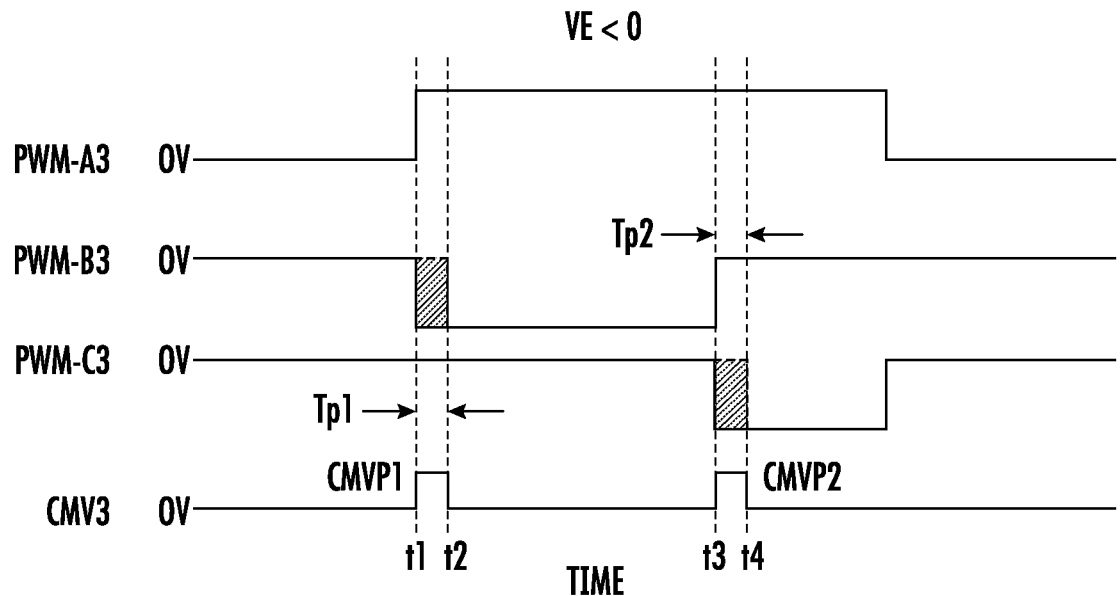
FIG. 9 provides a timing diagram depicting one example PWM pulse pattern generated in accordance with a reduced CMV scheme and modified in accordance with a first example implementation of a capacitor voltage balancing scheme wherein the voltage error associated with DC link capacitors of a multilevel power converter is less than threshold.
Figure 10:
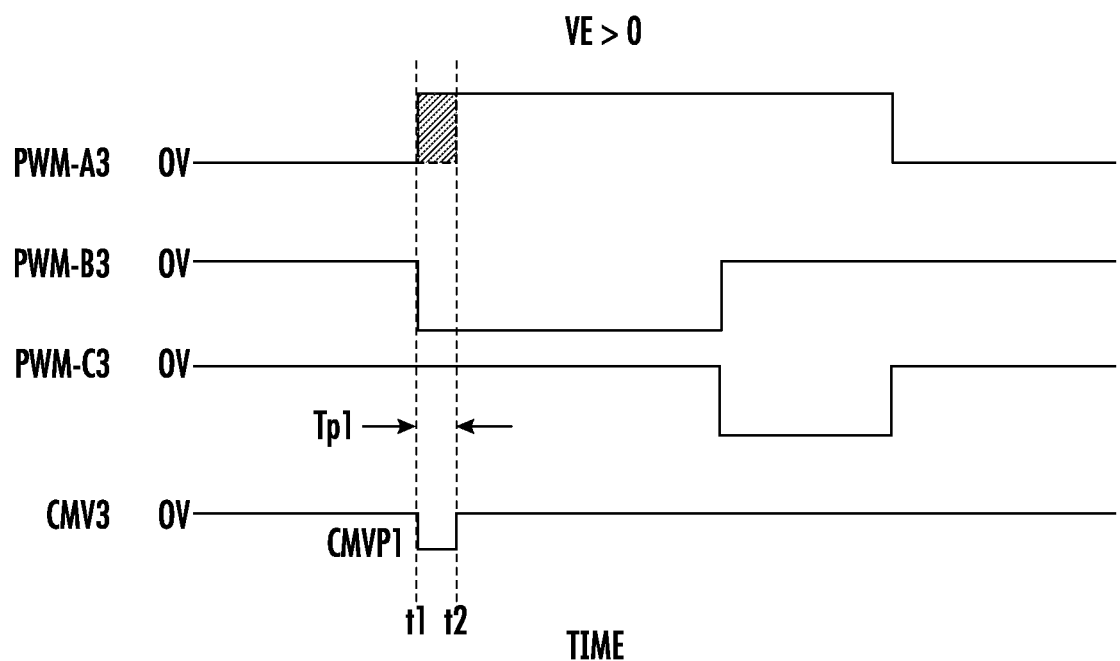
FIG. 10 provides a timing diagram depicting a PWM pulse pattern generated in accordance with a reduced CMV scheme and modified in accordance with the first example implementation of a capacitor voltage balancing scheme wherein the voltage error associated with DC link capacitors of a multilevel power converter is greater than threshold.

With reference now to FIGS. 2, 3, 4, 9, and 10, a first example implementation in which a PWM pulse pattern generated in accordance with a reduced CMV scheme is modified to render a modified pulse pattern based on a capacitor voltage balancing scheme will now be provided. Specifically, FIG. 9 provides a timing diagram depicting an example PWM pulse pattern generated in accordance with a reduced CMV scheme and modified in accordance with a first example implementation of a capacitor voltage balancing scheme wherein the voltage error associated with DC link capacitors of a multilevel power converter is less than threshold. FIG. 10 provides a timing diagram depicting the example PWM pulse pattern generated in accordance with a reduced CMV scheme and modified in accordance with the first example implementation of a capacitor voltage balancing scheme wherein the voltage error associated with DC link capacitors of a multilevel power converter is greater than threshold.

For the first example implementation, as shown in FIGS. 9 and 10, the PWM pulse pattern generated in accordance with the reduced CMV scheme includes three PWM signals, including a first PWM signal PWM-A3 associated with a first phase A, a second PWM signal PWM-B3 associated with a second phase B, and a third PWM signal PWM-C3 associated with a third phase C. The PWM signals PWM-A3, PWM-B3, PWM-C3 are shown as functions of time in FIGS. 9 and 10. The PWM pulse pattern can be generated by the PWM generator 222 of FIG. 3, e.g., based at least on part on the voltage commands Va, Vb, Vc associated with each phase.

The capacitor voltage balancing control module 225 of the PWM generator 222 can be executed by the one or more processors of the controller 220. In executing the capacitor voltage balancing control module 225, the one or more processors of the controller 220 can receive a first voltage Vdc1 associated with the first DC link capacitor C1 and can receive a second voltage Vdc2 associated with the second DC link capacitor C2. The one or more processors can execute the summation block 228 to determine the voltage error VE, e.g., by subtracting the second voltage Vdc2 from the first voltage Vdc1. The voltage error VE can be passed through the low-pass filter 230 to the control block 232.

For the first example implementation, as shown in FIGS. 9 and 10, in executing the control block 232, the one or more processors are configured to determine whether the voltage error VE is greater than, equal to, or less than a threshold, such as zero (0). When the voltage error VE is less than a threshold, the PWM pulse pattern is modified so that, for a given duty cycle, one or more CMV pulses having positive polarity are rendered or injected into the circuitry of the multilevel power converter 200. When the voltage error VE is greater than the threshold, the PWM pulse pattern is modified so that, for a given duty cycle, one or more CMV pulses each having negative polarity are rendered or injected into the circuitry of the multilevel power converter 200. When the voltage error VE is equal to the threshold, the PWM pulse pattern is not modified. In such instances, no CMV pulses are rendered or injected into the circuitry of the multilevel power converter 200.

In some instances, the voltage error VE is determined to be less than the threshold, which is zero (0) in this first example implementation. Accordingly, the PWM pulse pattern is modified so that, for a given duty cycle, one or more CMV pulses each having positive polarity are rendered or injected into the circuitry of the multilevel power converter 200. FIG. 9 depicts such an instance.

Specifically, at time t1, the falling edge of the pulse of the second PWM signal PWM-B3 is delayed by a predefined time Tp1 to a time t2. That is, the transition of the second PWM signal PWM-B3 from 0 to −1 is delayed or phase shifted by the predefined time Tp1. The predefined time Tp1 can be determined based on the magnitude of the voltage error VE, e.g., via a look-up table. Generally, the greater the magnitude of the voltage error VE, the longer the predefined time selected (which in turn results in a wider CMV pulse). When the falling edge of the pulse of the second PWM signal PWM-B3 is delayed by the predefined time Tp1, the falling edge no longer corresponds in time to the rising edge of the pulse of the first PWM signal PWM-A3, which rises at time t1. The third PWM signal PWM-C3 is zero (0) during the time period corresponding to time t1 to time t2. Accordingly, during this time period, the average of the three PWM signals between time t1 and time t2 is one third (⅓), which has a positive polarity. Consequently, between time t1 and time t2, a first CMV pulse CMVP1 is rendered or injected into the circuitry of the multilevel power converter 200. As noted above, the width of the first CMV pulse CMVP1 can be set by controlling the delay associated with the falling edge of the pulse of the second PWM signal PWM-B3.

At time t3, with reference still to FIG. 9, the falling edge of the pulse of the third PWM signal PWM-C3 is delayed by a predefined time Tp2 to a time t4. That is, the transition of the third PWM signal PWM-C3 from 0 to −1 is delayed or phase shifted by the predefined time Tp2. The predefined time Tp2 can be determined based on the magnitude of the voltage error VE, e.g., via a look-up table. When the falling edge of the pulse of the third PWM signal PWM-C3 is delayed by the predefined time Tp2, the falling edge no longer corresponds in time to the rising edge of the pulse of the second PWM signal PWM-B3, which rises at time t3. The first PWM signal PWM-A3 is one (1) during the time period corresponding to time t3 to time t4. Accordingly, during this time period, the average of the three PWM signals between time t3 and time t4 is one third (⅓), which has a positive polarity. Consequently, between time t3 and time t4, a second CMV pulse CMVP2 is rendered or injected into the circuitry of the multilevel power converter 200. The width of the second CMV pulse CMVP2 can be set by controlling the delay associated with the falling edge of the pulse of the third PWM signal PWM-C3.

Accordingly, the CMV signal CMV3 in FIG. 9 includes two CMV pulses, including the first CMV pulse CMVP1 and the second CMV pulse CMVP2. These rendered CMV pulses facilitate balancing of the voltage across the DC link capacitors C1, C2, e.g., as shown in Graph A of FIG. 8.

In other instances, when the voltage error VE is greater than the threshold, in executing the first example implementation, the PWM pulse pattern is modified so that, for a given duty cycle, one or more CMV pulses each having negative polarity are rendered or injected into the circuitry of the multilevel power converter 200. FIG. 10 depicts such an instance.

Particularly, as shown in FIG. 10, at time t1, the rising edge of the pulse of the first PWM signal PWM-A3 is delayed by a predefined time Tp1 corresponding to a time spanning from time t1 to a time t2. That is, the transition of the first PWM signal PWM-A3 from 0 to 1 is delayed or phase shifted by the predefined time Tp1. The predefined time Tp1 can be determined based on the magnitude of the voltage error VE, e.g., via a look-up table. When the rising edge of the pulse of the first PWM signal PWM-A3 is delayed by the predefined time Tp1, the rising edge no longer corresponds in time to the falling edge of the pulse of the second PWM signal PWM-B3, which falls at time t1. The third PWM signal PWM-C3 is zero (0) during the time period corresponding to time t1 to time t2 in FIG. 10. Accordingly, during this time period, the average of the three PWM signals between time t1 and time t2 is one third (⅓), which has a negative polarity. Consequently, between time t1 and time t2, a first CMV pulse CMVP1 is rendered or injected into the circuitry of the multilevel power converter 200. The width of the first CMV pulse CMVP1 can be set by controlling the delay associated with the rising edge of the pulse of the first PWM signal PWM-A3.

The CMV signal CMV3 in FIG. 10 includes a single CMV pulse, the first CMV pulse CMVP1. This rendered CMV pulse facilitates balancing of the voltage across the DC link capacitors C1, C2, e.g., as shown in Graph A of FIG. 8.

In some implementations of the first example implementation, the CMV pulse rendered is one of a number of CMV pulses rendered. In such implementations, the number of CMV pulses rendered is either one or a plurality depending on the polarity of the voltage error. For instance, as shown in FIG. 9, when the voltage error has a negative polarity, the number of CMV pulses rendered is a plurality as two (2) CMV pulses are rendered. In contrast, as shown in FIG. 10, when the voltage error has a positive polarity, the number of CMV pulses rendered is one (1) as only a single CMV pulse is rendered. In other implementations, the number of CMV pulses rendered is either one or a plurality depending on the magnitude of the voltage error.

Figure 11:
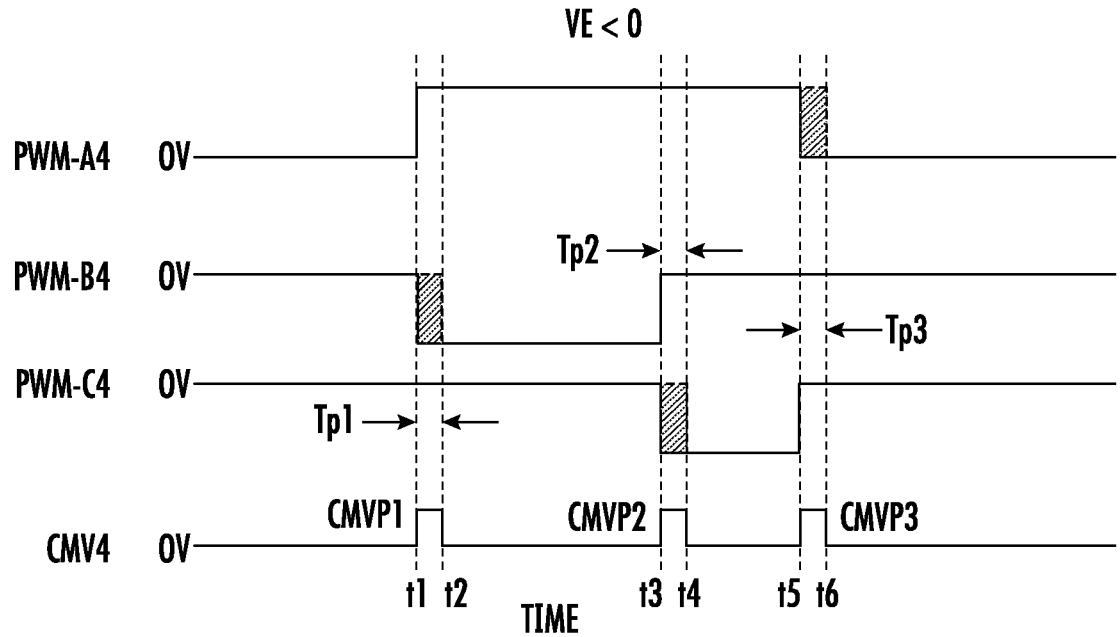
FIG. 11 provides a timing diagram depicting one example PWM pulse pattern generated in accordance with a reduced CMV scheme and modified in accordance with a second example implementation of a capacitor voltage balancing scheme wherein the voltage error associated with DC link capacitors of a multilevel power converter is less than threshold.
Figure 12:
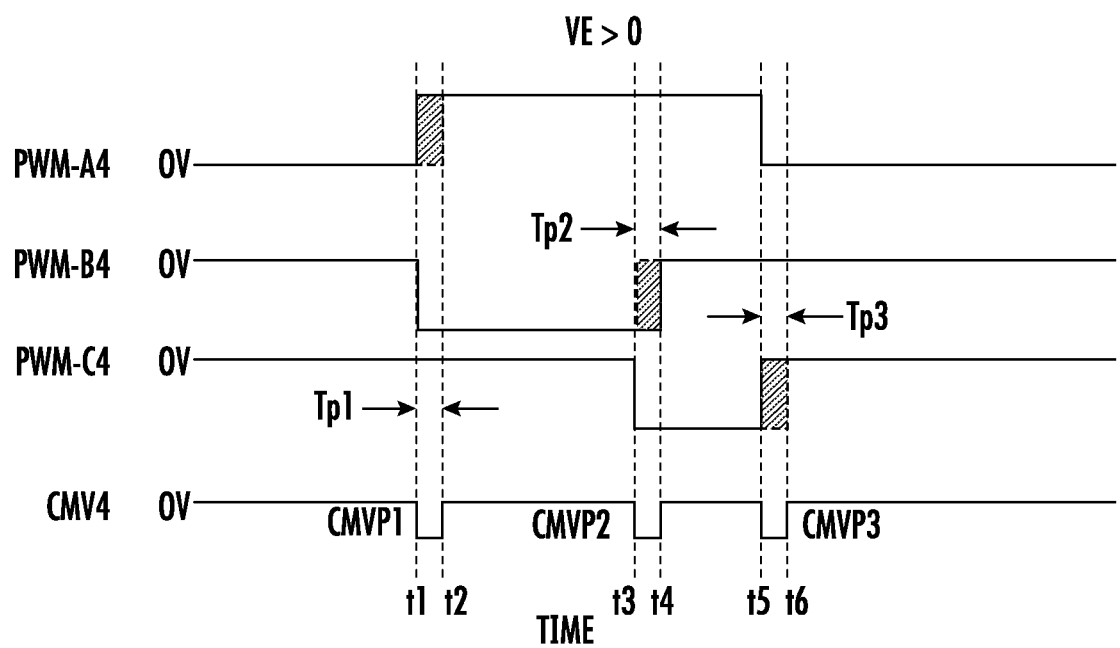
FIG. 12 provides a timing diagram depicting another example PWM pulse pattern generated in accordance with a reduced CMV scheme and modified in accordance with the second example implementation of a capacitor voltage balancing scheme wherein the voltage error associated with DC link capacitors of a multilevel power converter is greater than threshold.

With reference now to FIGS. 2, 3, 4, 11, and 12, a second example implementation in which a PWM pulse pattern generated in accordance with a reduced CMV scheme is modified to render a modified pulse pattern based on a capacitor voltage balancing scheme will now be provided. Particularly, FIG. 11 provides a timing diagram depicting an example PWM pulse pattern generated in accordance with a reduced CMV scheme and modified in accordance with a second example implementation of a capacitor voltage balancing scheme wherein the voltage error associated with DC link capacitors of a multilevel power converter is less than a threshold. FIG. 12 provides a timing diagram depicting the example PWM pulse pattern generated in accordance with a reduced CMV scheme and modified in accordance with the second example implementation of a capacitor voltage balancing scheme wherein the voltage error associated with DC link capacitors of a multilevel power converter is greater than the threshold.

For the second example implementation, the PWM pulse pattern generated in accordance with the reduced CMV scheme includes three PWM signals, including a first PWM signal PWM-A4 associated with a first phase A, a second PWM signal PWM-B4 associated with a second phase B, and a third PWM signal PWM-C4 associated with a third phase C. The PWM signals PWM-A4, PWM-B4, PWM-C4 are shown as functions of time in FIGS. 11 and 12. The PWM pulse pattern can be generated by the PWM generator 222 of FIG. 3, e.g., based at least on part on the voltage commands Va, Vb, Vc associated with each phase.

Further, for the second example implementation, the voltage error VE can be determined as provided above with respect to the first example implementation. The voltage error VE can be passed through the low-pass filter 230 and to the control block 232 of the capacitor voltage balancing control module 225.

For the second example implementation, in executing the control block 232, the one or more processors are configured to determine whether the voltage error VE is greater than, equal to, or less than a threshold, such as zero (0). Generally, in modifying the pulse width modulated pulse pattern in accordance with the second example implementation, the one or more processors are configured to adjust a pulse of each one of the PWM signals in the PWM pulse pattern so that a number of CMV pulses rendered is equal to a number of PWM signals in the PWM pulse pattern. More specifically, when the voltage error VE is less than the threshold, the PWM pulse pattern is modified so that, for a given duty cycle, the number of CMV pulses rendered is equal to the number of PWM signals in the PWM pulse pattern, wherein the CMV pulses rendered each have positive polarity. When the voltage error VE is greater than the threshold, the PWM pulse pattern is modified so that, for a given duty cycle, the number of CMV pulses rendered is equal to the number of PWM signals in the PWM pulse pattern, wherein the CMV pulses rendered each have negative polarity. When the voltage error VE is equal to the threshold, the PWM pulse pattern is not modified. In this regard, no CMV pulses are rendered or injected into the circuitry of the multilevel power converter 200.

With reference to FIG. 11, the voltage error VE is less than the threshold, which is zero (0) in this second example implementation. Accordingly, the PWM pulse pattern is modified so that, for a given duty cycle, the number of CMV pulses rendered is equal to the number of PWM signals in the PWM pulse pattern, wherein the CMV pulses rendered each have positive polarity. As depicted in FIG. 11, there are three (3) PWM signals in the PWM pulse pattern, and thus, three (3) CMV pulses each having positive polarity are rendered.

Specifically, at time t1, the falling edge of the pulse of the second PWM signal PWM-B4 is delayed by a predefined time Tp1, which is a time spanning from time t1 to a time t2. That is, the transition of the second PWM signal PWM-B4 from 0 to −1 is delayed or phase shifted by the predefined time Tp1. The predefined time Tp1 can be determined based on the magnitude of the voltage error VE, e.g., via a look-up table. When the falling edge of the pulse of the second PWM signal PWM-B4 is delayed by the predefined time Tp1, the falling edge no longer corresponds in time to the rising edge of the pulse of the first PWM signal PWM-A4, which rises at time t1. The third PWM signal PWM-C4 is zero (0) during the time period corresponding to time t1 to time t2. Accordingly, during this time period, the average of the three PWM signals between time t1 and time t2 is one third (⅓), which has a positive polarity. Consequently, between time t1 and time t2, a first CMV pulse CMVP1 is rendered or injected into the circuitry of the multilevel power converter 200.

At time t3, the falling edge of the pulse of the third PWM signal PWM-C4 is delayed by a predefined time Tp2, which is a time spanning from time t3 to a time t4. That is, the transition of the third PWM signal PWM-C4 from 0 to −1 is delayed or phase shifted by the predefined time Tp2. The predefined time Tp2 can be determined based on the magnitude of the voltage error VE, e.g., via a look-up table. When the falling edge of the pulse of the third PWM signal PWM-C4 is delayed by the predefined time Tp2, the falling edge no longer corresponds in time to the rising edge of the pulse of the second PWM signal PWM-B4, which rises at time t3. The first PWM signal PWM-A4 is one (1) during the time period corresponding to time t3 to time t4. Accordingly, during this time period, the average of the three PWM signals between time t3 and time t4 is one third (⅓), which has a positive polarity. Consequently, between time t3 and time t4, a second CMV pulse CMVP2 is rendered or injected into the circuitry of the multilevel power converter 200.

At time t5, the falling edge of the pulse of the first PWM signal PWM-A4 is delayed by a predefined time Tp3, which is a time spanning from time t5 to a time t6. That is, the transition of the first PWM signal PWM-A4 from 1 to 0 is delayed or phase shifted by the predefined time Tp3. The predefined time Tp3 can be determined based on the magnitude of the voltage error VE, e.g., via a look-up table.

When the falling edge of the pulse of the first PWM signal PWM-A4 is delayed by the predefined time Tp3, the falling edge no longer corresponds in time to the rising edge of the pulse of the third PWM signal PWM-C4, which rises at time t5. The second PWM signal PWM-B3 is zero (0) during the time period corresponding to time t5 to time t6. Accordingly, during this time period, the average of the three PWM signals between time t5 and time t6 is one third (⅓), which has a positive polarity. Consequently, between time t5 and time t6, a third CMV pulse CMVP3 is rendered or injected into the circuitry of the multilevel power converter 200.

Accordingly, the CMV signal CMV4 in FIG. 11 includes three CMV pulses, including the first CMV pulse CMVP1, the second CMV pulse CMVP2, and the third CMV pulse CMVP3. These rendered CMV pulses facilitate balancing of the voltage across the DC link capacitors C1, C2, e.g., as shown in Graph A of FIG. 8. In some instances, each CMV pulse CMVP1, CMVP2, CMVP3 has a same width. In other instances, the CMV pulses CMVP1, CMVP2, CMVP3 may have different widths.

As noted above, when the voltage error VE is greater than the threshold in implementing the second example implementation, the PWM pulse pattern is modified so that, for a given duty cycle, the number of CMV pulses rendered is equal to the number of PWM signals in the PWM pulse pattern, wherein the CMV pulses rendered each have negative polarity. FIG. 12 depicts such an instance. As depicted in FIG. 12, there are three (3) PWM signals in the PWM pulse pattern, and thus, three (3) CMV pulses each having negative polarity are rendered.

Particularly, as shown in FIG. 12, a first CMV pulse CMVP1 is rendered by delaying the rising edge of the pulse of the first PWM signal PWM-A4 by a time Tp1, a second CMV pulse CMVP2 is rendered by delaying the rising edge of the pulse of the second PWM signal PWM-B4 by a time Tp2, and a third CMV pulse CMVP3 is rendered by delaying the rising edge of the pulse of the third PWM signal PWM-C4 by a time Tp3. Accordingly, the CMV signal CMV4 in FIG. 12 includes three (3) CMV pulses, including the first CMV pulse CMVP1, the second CMV pulse CMVP2, and the third CMV pulse CMVP3. These rendered CMV pulses facilitate balancing of the voltage across the DC link capacitors C1, C2, e.g., as shown in Graph A of FIG. 8. In some instances, each CMV pulse CMVP1, CMVP2, CMVP3 has a same width. In other instances, the CMV pulses CMVP1, CMVP2, CMVP3 may have different widths.

Figure 13:
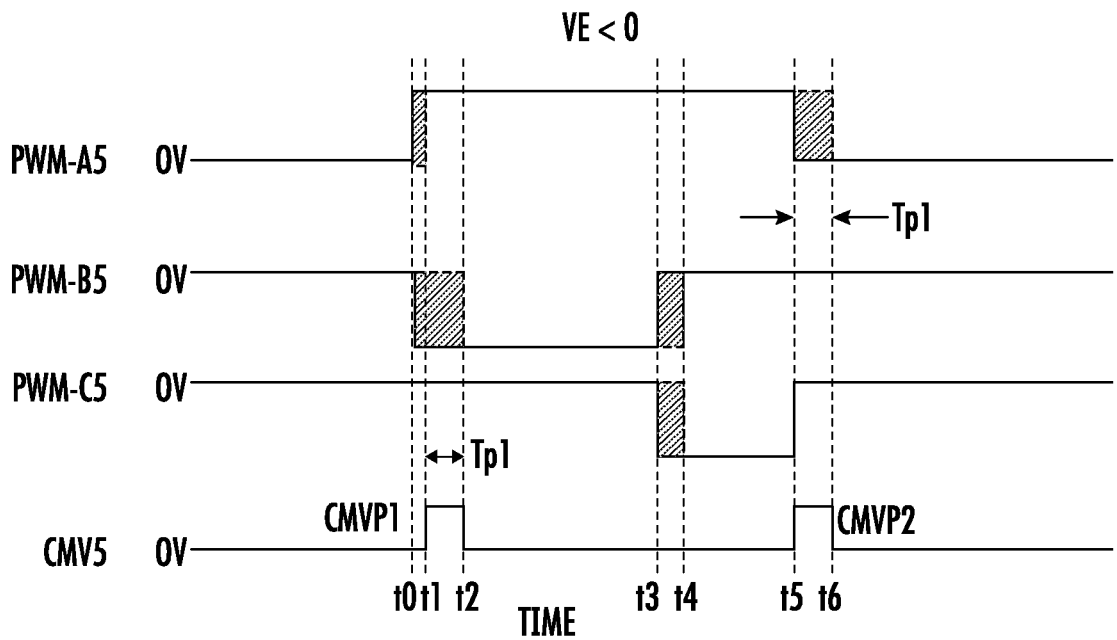
FIG. 13 provides one example PWM pulse pattern generated in accordance with a reduced CMV scheme and modified in accordance with a third example implementation of a capacitor voltage balancing scheme wherein the voltage error associated with DC link capacitors of a multilevel power converter is less than threshold.
Figure 14:
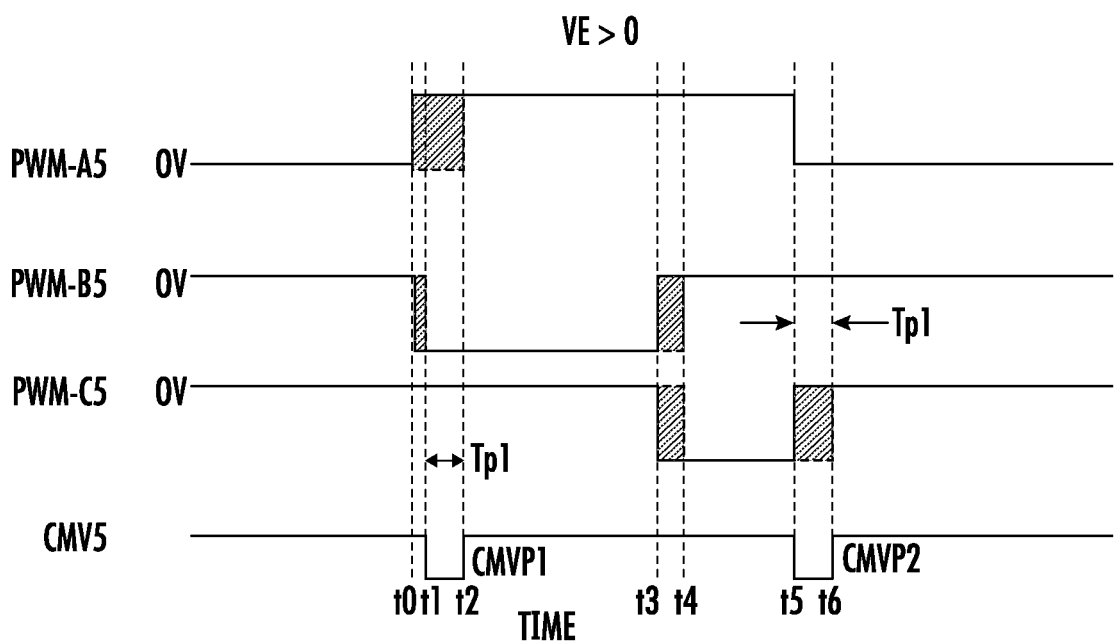
FIG. 14 provides another example PWM pulse pattern generated in accordance with a reduced CMV scheme and modified in accordance with the third example implementation of a capacitor voltage balancing scheme wherein the voltage error associated with DC link capacitors of a multilevel power converter is greater than threshold.

With reference now to FIGS. 2, 3, 4, 13, and 14, a third example implementation in which a PWM pulse pattern generated in accordance with a reduced CMV scheme is modified to render a modified pulse pattern based on a capacitor voltage balancing scheme will now be provided. Specifically, FIG. 13 provides a timing diagram depicting an example PWM pulse pattern generated in accordance with a reduced CMV scheme and modified in accordance with a third example implementation of a capacitor voltage balancing scheme wherein the voltage error associated with DC link capacitors of a multilevel power converter is less than a threshold. FIG. 14 provides a timing diagram depicting the example PWM pulse pattern generated in accordance with a reduced CMV scheme and modified in accordance with the third example implementation of a capacitor voltage balancing scheme wherein the voltage error associated with DC link capacitors of a multilevel power converter is greater than the threshold.

For the third example implementation, the PWM pulse pattern generated in accordance with the reduced CMV scheme includes three PWM signals, including a first PWM signal PWM-A5 associated with a first phase A, a second PWM signal PWM-B5 associated with a second phase B, and a third PWM signal PWM-C5 associated with a third phase C. The PWM signals PWM-A5, PWM-B5, PWM-C5 are shown as functions of time in FIGS. 13 and 14. The PWM pulse pattern can be generated by the PWM generator 222 of FIG. 3, e.g., based at least on part on the voltage commands Va, Vb, Vc associated with each phase.

For the third example implementation, the voltage error VE can be determined as provided above with respect to the first example implementation. The voltage error VE can be passed through the low-pass filter 230 and to the control block 232 of the capacitor voltage balancing control module 225.

For the third example implementation, in executing the control block 232, the one or more processors are configured to determine whether the voltage error VE is greater than, equal to, or less than a threshold, which is zero (0) in the third example implementation. When the voltage error VE is less than the threshold, the PWM pulse pattern is modified so that, for a given duty cycle, a pulse of each PWM signal in the PWM pulse pattern is adjusted to render at least two CMV pulses, wherein the CMV pulses rendered each have positive polarity. When the voltage error VE is greater than the threshold, the PWM pulse pattern is modified so that, for a given duty cycle, a pulse of each PWM signal in the PWM pulse pattern is adjusted to render at least two CMV pulses, wherein the CMV pulses rendered each have negative polarity. When the voltage error VE is equal to the threshold, the PWM pulse pattern is not modified. In this regard, no CMV pulses are rendered or injected into the circuitry of the multilevel power converter 200.

With reference to FIG. 13, the voltage error VE is less than the threshold, which is zero (0) in this third example implementation. Accordingly, the PWM pulse pattern is modified so that, for a given duty cycle, a pulse of each PWM signal in the PWM pulse pattern is adjusted to render at least two CMV pulses, wherein the CMV pulses rendered each have positive polarity.

Specifically, as shown in FIG. 13, the rising edge of the pulse of the first PWM signal PWM-A5 is delayed by a time corresponding to one third (⅓) of a predefined time Tp1. In this manner, the rising edge of the pulse of the first PWM signal PWM-A5 is delayed from a time t0 to a time t1. Stated differently, the transition of the first PWM signal PWM-A5 from 0 to 1 is delayed or phase shifted by one third of the predefined time Tp1. The predefined time Tp1 can be determined based on the magnitude of the voltage error VE, e.g., via a look-up table. Also, the falling edge of the pulse of the second PWM signal PWM-B5 is delayed by a time corresponding to four thirds (4/3) of the predefined time Tp1. In this manner, the falling edge of the pulse of the second PWM signal PWM-B5 is delayed from time t0 to a time t2. Stated another way, the transition of the second PWM signal PWM-B5 from 0 to −1 is delayed or phase shifted by four thirds of the predefined time Tp1. The third PWM signal PWM-C5 is zero (0) during the time period corresponding to time t0 to time t2. Accordingly, during the time period spanning from time t0 to time t1, the average of the three PWM signals is zero (0). During the time period spanning from time t1 to time t2, the average of the three PWM signals between time t1 and time t2 is one third (⅓), which has a positive polarity. Consequently, between time t1 and time t2, a first CMV pulse CMVP1 is rendered or injected into the circuitry of the multilevel power converter 200.

As further shown in FIG. 13, at time t3, the rising edge of the pulse of the second PWM signal PWM-B5 is delayed by a time corresponding to two thirds (⅔) of the predefined time Tp1. In this manner, the rising edge of the pulse of the second PWM signal PWM-B5 is delayed from a time t3 to a time t4. Stated differently, the transition of the second PWM signal PWM-B5 from −1 to 0 is delayed or phase shifted by two thirds (⅔) of the predefined time Tp1. This extends the width of the pulse of the second PWM signal PWM-B5 by two thirds (⅔) of the predefined time Tp1. Given the four thirds (⁴⁄₃) of the predefined time Tp1 delay from time t0 to time t2 and the two thirds (⅔) of the predefined delay from time t3 to time t4, the duty cycle of the second PWM signal PWM-B3 is extended in total by two thirds (⅔) of the predefined time Tp1.

The falling edge of the pulse of the third PWM signal PWM-C5 is delayed by a time corresponding to two thirds (⅔) of the predefined time Tp1. In this regard, the falling edge of the pulse of the third PWM signal PWM-C5 is delayed from time t3 to time t4. Stated differently, the transition of the third PWM signal PWM-B5 from 0 to −1 is delayed or phase shifted by two thirds (⅔) of the predefined time Tp1. Given the two thirds (⅔) of the predefined time Tp1 delay from time t3 to time t4, the duty cycle of the third PWM signal PWM-C5 is shortened in total by two thirds (2/3) of the predefined time Tp1. The falling edge of the pulse of the third PWM signal PWM-C5 is delayed so that the rising edge of the pulse of the second PWM signal PWM-B5 corresponds in time with the falling edge of the third PWM signal PWM-C5.

With reference still to FIG. 13, the falling edge of the pulse of the first PWM signal PWM-A5 is delayed by a time corresponding to the predefined time Tp1. In this manner, the falling edge of the pulse of the first PWM signal PWM-A5 is delayed from a time t5 to a time t6. Stated differently, the transition of the first PWM signal PWM-A5 from 1 to 0 is delayed or phase shifted by the predefined time Tp1. Given the one third (⅓) of the predefined time Tp1 delay from time t0 to time t1 and the predefined delay from time t5 to time t6, the duty cycle of the first PWM signal PWM-A5 is extended in total by two thirds (⅔) of the predefined time Tp1. Moreover, given that the first PWM signal PWM-A5 is extended by two thirds (⅔) of the predefined time Tp1, the second PWM signal PWM-B5 is shortened by two thirds (⅔) of the predefined time Tp1, and the third PWM signal PWM-B5 is shortened by two thirds (⅔) of the predefined time Tp1, the total duty of the pulse pattern is shortened by two thirds (⅔).

Further, the second and third PWM signals PWM-B5, PWM-C5 are both zero (0) during the time period corresponding to time t5 to time t6. Accordingly, the average of the three PWM signals between time t5 and time t6 is one third (⅓), which has a positive polarity. Consequently, between time t5 and time t6, a second CMV pulse CMVP2 is rendered or injected into the circuitry of the multilevel power converter 200.

Accordingly, the CMV signal CMV5 in FIG. 13 includes two CMV pulses, including the first CMV pulse CMVP1 and the second CMV pulse CMVP2. These rendered CMV pulses facilitate balancing of the voltage across the DC link capacitors C1, C2, e.g., as shown in Graph A of FIG. 8. Notably, in rendering the first CMV pulse CMVP1 and the second CMV pulse CMVP2, the pulses of all three PWM signals PWM-A5, PWM-B5, and PWM-C5 are intelligently adjusted. This may advantageously lead to less distortion in the differential mode signal.

As noted above, when the voltage error VE is greater than the threshold in implementing the third example implementation, the PWM pulse pattern is modified so that, for a given duty cycle, a pulse of each PWM signal in the PWM pulse pattern is adjusted to render at least two CMV pulses, wherein the CMV pulses rendered each have negative polarity. FIG. 14 depicts such an instance.

Particularly, as shown in FIG. 14, the falling edge of the pulse of the second PWM signal PWM-B5 is delayed by a time corresponding to one third (⅓) of a predefined time Tp1. In this manner, the falling edge of the pulse of the second PWM signal PWM-B5 is delayed from a time t0 to a time t1. Stated differently, the transition of the second PWM signal PWM-B5 from 0 to −1 is delayed or phase shifted by one third of the predefined time Tp1. The predefined time Tp1 can be determined based on the magnitude of the voltage error VE, e.g., via a look-up table. Also, the rising edge of the pulse of the first PWM signal PWM-A5 is delayed by a time corresponding to four thirds (⁴⁄₃) of the predefined time Tp1. In this manner, the rising edge of the pulse of the first PWM signal PWM-A5 is delayed from time t0 to a time t2. Stated differently, the transition of the first PWM signal PWM-A5 from 0 to 1 is delayed or phase shifted by four thirds (⁴⁄₃) of the predefined time Tp1. Given the four thirds (⁴⁄₃) of the predefined time Tp1 delay from time t0 to time t2, the duty cycle of the first PWM signal PWM-A5 is shortened in total by four thirds (⁴⁄₃) of the predefined time Tp1.

In addition, the third PWM signal PWM-C5 is zero (0) during the time period corresponding to time t0 to time t2. Accordingly, during the time period spanning from time t0 to time t1, the average of the three PWM signals is zero (0). During the time period spanning from time t1 to time t2, the average of the three PWM signals between time t1 and time t2 is one third (⅓), which has a negative polarity. Consequently, between time t1 and time t2, a first CMV pulse CMVP1 is rendered or injected into the circuitry of the multilevel power converter 200.

As further shown in FIG. 14, at time t3, the rising edge of the pulse of the second PWM signal PWM-B5 is delayed by a time corresponding to two thirds (⅔) of the predefined time Tp1. In this manner, the rising edge of the pulse of the second PWM signal PWM-B5 is delayed from a time t3 to a time t4. Stated differently, the transition of the second PWM signal PWM-B5 from −1 to 0 is delayed or phase shifted by two thirds (⅔) of the predefined time Tp1. This extends the width of the pulse of the second PWM signal PWM-B5 by two thirds (⅔) of the predefined time Tp1. Given the one third (⅓) of the predefined time Tp1 delay from time t0 to time t1 and the two thirds (⅔) of the predefined delay from time t3 to time t4, the duty cycle of the second PWM signal PWM-B5 is extended in total by one third (⅓) of the predefined time Tp1.

The falling edge of the pulse of the third PWM signal PWM-C5 is delayed by a time corresponding to two thirds (⅔) of the predefined time Tp1. In this regard, the falling edge of the pulse of the third PWM signal PWM-C3 is delayed from time t3 to time t4. Stated differently, the transition of the third PWM signal PWM-B5 from 0 to −1 is delayed or phase shifted by two thirds (⅔) of the predefined time Tp1. The falling edge of the pulse of the third PWM signal PWM-C5 is delayed so that the rising edge of the pulse of the second PWM signal PWM-B5 corresponds in time with the falling edge of the third PWM signal PWM-C5.

With reference still to FIG. 14, the rising edge of the pulse of the third PWM signal PWM-C5 is delayed by a time corresponding to the predefined time Tp1. In this manner, the rising edge of the pulse of the third PWM signal PWM-C5 is delayed from a time t5 to a time t6. Stated differently, the transition of the third PWM signal PWM-C5 from −1 to 0 is delayed or phase shifted by the predefined time Tp1. Given the two thirds (⅔) of the predefined time Tp1 delay from time t3 to time t4 and the predefined time Tp1 delay from time t5 to time t6, the duty cycle of the third PWM signal PWM-C5 is extended in total by one third (⅓) of the predefined time Tp1. Moreover, given that the first PWM signal PWM-A5 is shortened by four thirds (4/3) of the predefined time Tp1, the second PWM signal PWM-B5 is extended by one third (⅓) of the predefined time Tp1, and the third PWM signal PWM-B5 is extended by one third (⅓) of the predefined time Tp1, the total duty of the pulse pattern is shortened by two thirds (⅔).

Further, as shown in FIG. 14, the first and second PWM signals PWM-A5, PWM-B5 are both zero (0) during the time period corresponding to time t5 to time t6. Accordingly, the average of the three PWM signals between time t5 and time t6 is one third (⅓), which has a negative polarity. Consequently, between time t5 and time t6, a second CMV pulse CMVP2 is rendered or injected into the circuitry of the multilevel power converter 200.

Accordingly, the CMV signal CMV5 in FIG. 14 includes two CMV pulses, including the first CMV pulse CMVP1 and the second CMV pulse CMVP2. These rendered CMV pulses facilitate balancing of the voltage across the DC link capacitors C1, C2, e.g., as shown in Graph A of FIG. 8. Notably, in rendering the first CMV pulse CMVP1 and the second CMV pulse CMVP2, the pulses of all three PWM signals PWM-A5, PWM-B5, and PWM-C5 are intelligently adjusted, just as in FIG. 13. This may advantageously lead to less distortion in the CMV signal CVM5.

In some implementations of the third example implementation, in modifying the PWM pulse pattern, the one or more processors are configured to adjust a pulse of each PWM signal of the PWM pulse pattern so that the number of CMV pulses rendered is at least one less than the number of PWM signals in the PWM pulse pattern. For instance, as shown in FIG. 13, the number of CMV pulses rendered (two (2)) is at least one less than the number of PWM signals in the PWM pulse pattern (three (3)). Further, as shown in both FIGS. 13 and 14, in some implementations of the third example implementation, in modifying the PWM pulse pattern, the one or more processors are configured to adjust both a falling edge and a leading edge of at least one pulse of at least one PWM signal of the PWM pulse pattern.

In some instances, such as in implementing any one of the first, second, or third example implementations described above, the one or more processors of the controller 220 can be configured to determine whether a magnitude of the voltage error VE is within a predetermined range. The predetermined range can have an upper limit and a lower limit. As one example, the upper limit of the predetermined range can be set at 1 and the lower limit of the predetermined range can be set at −1. As another example, the upper limit of the predetermined range can be set at 2 and the lower limit of the predetermined range can be set at −2. The upper and lower limits of the predetermined range can be set as any suitable numbers. In some embodiments, zero (0) is included within the predetermined range. In other embodiments, zero (0) is not included within the predetermined range.

In such implementations, when the magnitude of the voltage error VE is not within the predetermined range, a PWM pulse pattern can be modified to render a modified pulse pattern so that at least one pulse of at least one PWM signal of the PWM pulse pattern is adjusted. In contrast, when the magnitude of the voltage error VE is within the predetermined range, the PWM pulse pattern is not modified and the one or more processors cause the plurality of switches to implement the duty cycle based at least in part on the "unmodified" PWM pulse pattern. Determining whether the voltage error VE is or is not within a predetermined range provides hysteresis control and ensures that the capacitor voltage balancing scheme is implemented only when desired, which may minimize distortion of the CMV signal and may reduce CMV overall.

In some other implementations, the one or more processors of the controller 220 can be configured to determine whether a magnitude of the voltage error VE is within a first predetermined range or within a second predetermined range. In such implementations, when the magnitude of the voltage error VE is within the first predetermined range or the second predetermined range, the PWM pulse pattern is modified to render the modified pulse pattern so that at least one pulse of at least one of the PWM signals is adjusted, wherein when the magnitude of the voltage error VE is within the first predetermined range, more CMV is injected than when the magnitude of the voltage error VE is within the second predetermined range. In this regard, more or less CMV voltage can be injected based on the threshold level of the voltage error VE.

Further, in some example implementations, such as in any one of the first, second, or third example implementations provided herein, instead of delaying a given rising edge or falling edge of a pulse of a PWM signal, the given rising edge or falling edge can be advanced in time to adjust the pulse.

In yet other implementations, the one or more processors of the controller 220 can switch between the first, second, and/or third example implementations provided herein and can select the example implementation based at least in part one or more criteria. As one example, the one or more processors of the controller 220 can switch and/or select between the first, second, and/or third example implementation based at least in part on the magnitude of the voltage error VE. For instance, for smaller magnitudes, the first example implementation can be selected for implementation. For medium magnitudes, the third example implementation can be selected for implementation. For larger magnitudes, the second example implementation can be selected for implementation. Other criteria are possible, such as CMV signal distortion level, the voltage level of the multilevel power converter, etc. Further, hysteresis control with multiple thresholds can be used for selection of one of the example implementations.

Further, the pulse widths of the CMV pulses rendered or injected into the circuitry of a multilevel power converter can be controlled. As one example, the pulse widths of the CMV pulses can be controlled based at least in part on the magnitude of the voltage error VE. Generally, the larger the voltage error VE, the larger the pulse width of the CMV pulses to be rendered. Conversely, the smaller the voltage error VE, the smaller the pulse width of the CMV pulses to be rendered.

Figure 15:
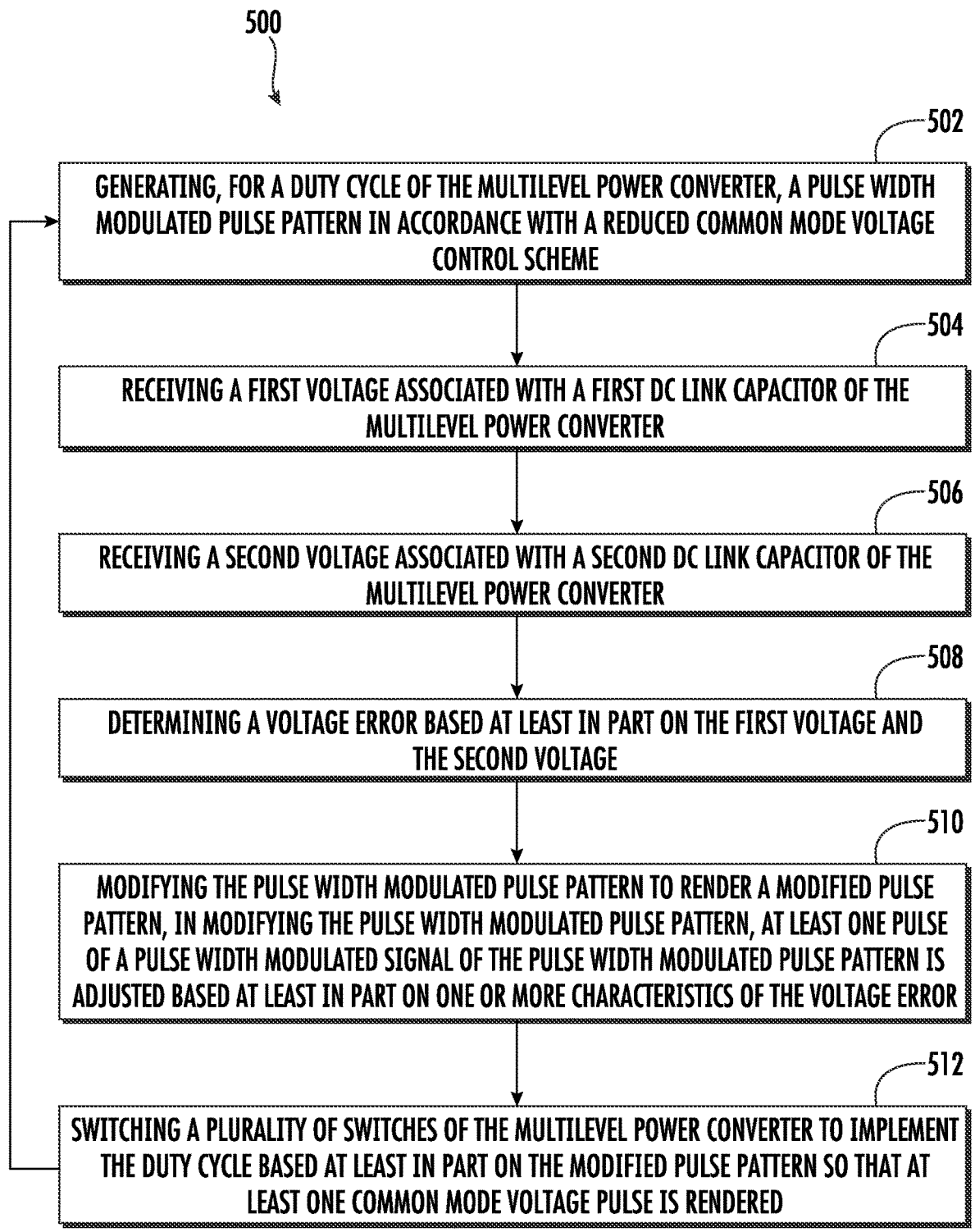
FIG. 15 provides a flow diagram for a method of controlling a multilevel power converter for an aircraft according to an example embodiment of the present disclosure.

FIG. 15 provides a flow diagram for a method 500 of controlling a multilevel power converter according to an example aspect of the present disclosure. The method 500 can be utilized to control the multilevel power converter 200 of FIG. 2, for example.

At 502, the method 500 includes generating, for a duty cycle of the multilevel power converter, a pulse width modulated pulse pattern in accordance with a reduced CMV scheme. For instance, a PWM generator of a controller of the multilevel power converter can receive voltage commands associated with each phase of power. For example, the received voltage commands can correspond to voltage commands Va, Vb, Vc, which can each be associated with a respective phase of power, e.g., A, B, C. The voltage commands can be received as sinusoidal reference signals offset from one another in phase, e.g., by one hundred twenty degrees (120°). The voltage commands can be generated by a controller of the multilevel power converter, e.g., based on a voltage command from a supervisor controller, a thrust output, etc., or by another suitable computing device. Based at least in part on the voltage commands, the controller can generate a PWM pulse pattern, e.g., by a triangle-wave compare method or by another known technique. The PWM pulse pattern has a PWM signal associated with each phase of power. The controller can utilize any suitable zero or reduced CMV scheme to generate the PWM pulse pattern.

At 504, the method 500 includes receiving a first voltage associated with a first DC link capacitor of the multilevel power converter. For instance, a first sensor associated with the first DC link capacitor can sense the voltage across the first DC link capacitor. The sensed first voltage can be received by the controller of the multilevel power converter.

At 506, the method 500 includes receiving a second voltage associated with a second DC link capacitor of the multilevel power converter. For instance, a second sensor associated with the second DC link capacitor can sense the voltage across the second DC link capacitor. The sensed second voltage can be received by the controller of the multilevel power converter.

At 508, the method 500 includes determining a voltage error based at least in part on the first voltage and the second voltage. For instance, the controller of the multilevel power converter can subtract the second voltage from the first voltage to determine the voltage error. In other implementations, the controller can subtract the first voltage from the second voltage to determine the voltage error. The voltage error can range from negative three to positive three, for example.

At 510, the method 500 includes modifying the pulse width modulated pulse pattern to render a modified pulse pattern. In modifying the pulse width modulated pulse pattern, at least one pulse of a pulse width modulated signal of the pulse width modulated pulse pattern is adjusted based at least in part on one or more characteristics of the voltage error. For instance, the controller can adjust the at least one pulse of the PWM signal of the PWM pulse pattern based at least in part on a magnitude and a polarity of the voltage error. The magnitude of the voltage error can be used to determine a predetermined time that a rising or falling edge of a pulse may be delayed or advanced in time, e.g., so that a width of the pulse is changed (increased or decreased) by about one eighth of its unmodified pulse width, by about one quarter of its unmodified width, by about one half of its unmodified pulse width, etc. Adjusting the timing of the rising and/or falling edge of a pulse by the predetermined time effectively controls the pulse width of the CMV pulses rendered at 512 of the method 500. The polarity of the voltage error facilitates determining which edge of a pulse is to be delayed or advanced so that the CMV pulses rendered at 512 of the method have the correct polarity to balance the voltages across the first and second capacitors. That is, the polarity of the voltage error can be used to determine the polarity of the CMV pulses rendered at 512.

At 512, the method 500 includes switching a plurality of switches of the multilevel power converter to implement the duty cycle based at least in part on the modified pulse pattern so that at least one CMV pulse is rendered. For instance, the controller of the multilevel power converter can generate one or more control signals based at least in part on the modified pulse pattern. The one or more signals can be routed to the one or more gate drivers associated with the switches. The one or more gate drivers can modulate the switches to implement the duty cycle based at least in part on the one or more control signals. In implementing the duty cycle, a CMV pulse is injected, inserted, or otherwise rendered into the circuitry of the multilevel power converter. In some implementations, the CMV pulse is one of a plurality of CMV pulses rendered. The CMV pulses intelligently inserted into the circuitry may balance the voltages across the first and second DC link capacitors.

As shown in FIG. 15, the method 500 may iterate. The method 500 may iterate continuously for continuous DC link capacitor voltage balancing. In such implementations, the method 500 may iterate continuously so that the PWM pulse pattern for each duty cycle is generated in accordance with a reduced CMV scheme, and when desired, modified for DC link capacitor voltage balancing. In yet other implementations, the method 500 may iterate at a predetermined interval, e.g., every five (5) duty cycles, every ten (10) duty cycles, every twenty (20) duty cycles, etc. In some further implementations, the method 500 may iterate upon one or target conditions being met. For instance, a target condition can include a voltage level of the multilevel power converter, one or more operating conditions associated with the aircraft in which the multilevel power converter is disposed (e.g., altitude, thrust demand, power demand of one or more aircraft loads, etc.), or one or more other target conditions.

In some implementations of method 500 where the voltage error is determined by subtracting the second voltage from the first voltage at 508, when the voltage error is less than a threshold (e.g., zero (0)), the PWM pulse pattern is modified at 510 so that, for a given duty cycle, the CMV pulses rendered at 512 have positive polarity. In such implementations, when the voltage error VE is greater than a threshold (e.g., zero (0)), the PWM pulse pattern is modified at 510 so that, for a given duty cycle, the CMV pulses rendered at 512 have a negative polarity.

In other implementations of 500 where the voltage error is determined by subtracting the first voltage from the second voltage at 508, when the voltage error is less than a threshold (e.g., zero (0)), the PWM pulse pattern is modified at 510 so that, for a given duty cycle, the CMV pulses rendered at 512 have negative polarity. In such implementations, when the voltage error VE is greater than a threshold (e.g., zero (0)), the PWM pulse pattern is modified at 510 so that, for a given duty cycle, the CMV pulses rendered at 512 have a positive polarity.

In some implementations of method 500, the PWM pulse pattern is modified at 510 so that the number of CMV pulses rendered at 512 is equal to the number of PWM signals in the PWM pulse pattern. For example, where the PWM pulse pattern includes three (3) PWM signals, the number of CMV pulses rendered at 512 is three (3). FIGS. 11 and 12 both provide examples of such implementations.

In some implementations, where the voltage error is determined by subtracting the second voltage from the first voltage at 508, when the voltage error is less than a threshold (e.g., zero (0)), the PWM pulse pattern is modified at 510 so that, for a given duty cycle, the number of CMV pulses rendered at 512 is equal to the number of PWM signals in the PWM pulse pattern, wherein the CMV pulses rendered each have positive polarity. Further, in such implementations, when the voltage error VE is greater than a threshold (e.g., zero (0)), the PWM pulse pattern is modified at 510 so that, for a given duty cycle, the number of CMV pulses rendered at 512 is equal to the number of PWM signals in the PWM pulse pattern, wherein the CMV pulses rendered each have negative polarity.

In other implementations, where the voltage error is determined by subtracting the first voltage from the second voltage at 508, when the voltage error is less than a threshold (e.g., zero (0)), the PWM pulse pattern is modified at 510 so that, for a given duty cycle, the number of CMV pulses rendered at 512 is equal to the number of PWM signals in the PWM pulse pattern, wherein the CMV pulses rendered each have negative polarity. Further, in such implementations, when the voltage error VE is greater than a threshold (e.g., zero (0)), the PWM pulse pattern is modified at 510 so that, for a given duty cycle, the number of CMV pulses rendered at 512 is equal to the number of PWM signals in the PWM pulse pattern, wherein the CMV pulses rendered each have positive polarity.

In some implementations of method 500, the PWM pulse pattern is modified at 510 so that a pulse of each PWM signal in the PWM pulse pattern is adjusted in such a way that at least two (2) CMV pulses are rendered at 512. For example, where the PWM pulse pattern includes three (3) PWM signals each having at least one pulse for a given duty cycle, a pulse of each one of the three (3) PWM signals in the PWM pulse pattern is adjusted, thereby rendering at least two (2) CMV pulses at 512. FIGS. 13 and 14 both provide examples of such implementations.

In some implementations, where the voltage error is determined by subtracting the second voltage from the first voltage at 508, when the voltage error is less than a threshold (e.g., zero (0)), the PWM pulse pattern is modified at 510 so that, for a given duty cycle, a pulse of each PWM signal in the PWM pulse pattern is adjusted in such a way that at least two (2) CMV pulses are rendered at 512, wherein the at least two (2) CMV pulses each have positive polarity. In such implementations, when the voltage error is greater than a threshold (e.g., zero (0)), the PWM pulse pattern is modified at 510 so that, for a given duty cycle, a pulse of each PWM signal in the PWM pulse pattern is adjusted in such a way that at least two (2) CMV pulses are rendered at 512, wherein the at least two (2) CMV pulses each have negative polarity.

In other implementations, where the voltage error is determined by subtracting the first voltage from the second voltage at 508, when the voltage error is less than a threshold (e.g., zero (0)), the PWM pulse pattern is modified at 510 so that, for a given duty cycle, a pulse of each PWM signal in the PWM pulse pattern is adjusted in such a way that at least two (2) CMV pulses are rendered at 512, wherein the at least two (2) CMV pulses each have negative polarity. In such implementations, when the voltage error is greater than a threshold (e.g., zero (0)), the PWM pulse pattern is modified at 510 so that, for a given duty cycle, a pulse of each PWM signal in the PWM pulse pattern is adjusted in such a way that at least two (2) CMV pulses are rendered at 512, wherein the at least two (2) CMV pulses each have positive polarity.

In some further implementations, the method 500 can include determining whether a magnitude of the voltage error VE is within a predetermined range. The predetermined range can have an upper limit and a lower limit. As one example, the upper limit of the predetermined range can be set at 5 and the lower limit of the predetermined range can be set at −5. In such implementations, when the magnitude of the voltage error VE is not within the predetermined range, the PWM pulse pattern can be modified at 510 to render a modified pulse pattern so that at least one pulse of at least one PWM signal of the PWM pulse pattern is adjusted. In contrast, when the magnitude of the voltage error VE is within the predetermined range, the PWM pulse pattern is not modified at 510, and consequently, the plurality of switches are modulated at 512 to implement the duty cycle based at least in part on the "unmodified" PWM pulse pattern. In some implementations, the predetermined range includes zero (0).

Figure 16:
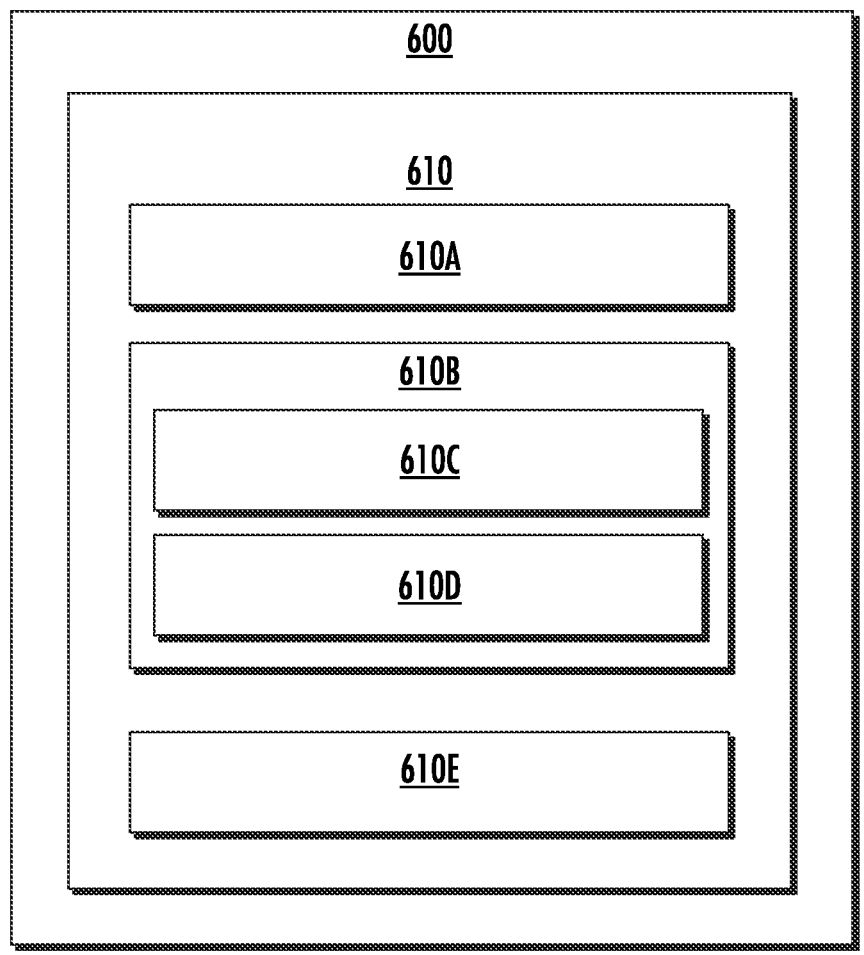
FIG. 16 provides a computing system according to example embodiments of the present disclosure.

FIG. 16 provides an example computing system 600 according to example embodiments of the present disclosure. The computing devices or elements described herein, such as the computing device 192, the supervisor controller 188, and the controller 220, may include various components and perform various functions of the computing system 600 provided below.

The computing system 600 can include one or more computing device(s) 610. The computing device(s) 610 can include one or more processor(s) 610A and one or more memory device(s) 610B. The one or more processor(s) 610A can include any suitable processing device, such as a microprocessor, microcontroller, integrated circuit, logic device, and/or other suitable processing device. The one or more memory device(s) 610B can include one or more computer-executable or computer-readable media, including, but not limited to, non-transitory computer-readable medium, RAM, ROM, hard drives, flash drives, and/or other memory devices.

The one or more memory device(s) 610B can store information accessible by the one or more processor(s) 610A, including computer-readable instructions 610C that can be executed by the one or more processor(s) 610A. The instructions 610C can be any set of instructions that, when executed by the one or more processor(s) 610A, cause the one or more processor(s) 610A to perform operations, such as controlling operation of a multilevel power converter. The instructions 610C can be software written in any suitable programming language or can be implemented in hardware. Additionally, and/or alternatively, the instructions 610C can be executed in logically and/or virtually separate threads on processor(s) 610A. The memory device(s) 610B can further store data 610D that can be accessed by the processor(s) 610A. For example, the data 610D can include models, lookup tables, databases, etc.

The computing device(s) 610 can also include a network interface 610E used to communicate, for example, with the other components of system 600 (e.g., via a communication network). The network interface 610E can include any suitable components for interfacing with one or more network(s), including for example, transmitters, receivers, ports, controllers, antennas, and/or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

To summarize, PWM switching schemes for multilevel power converters provided herein not only reduce common mode emissions and associated electromagnetic interference in electrical power systems, but may also balance the voltage between DC link capacitors. In accordance with the inventive aspects of the present disclosure, a PWM pulse pattern for a given duty cycle can be generated in accordance with a zero or reduced CMV scheme. A voltage error can be determined based at least in part on a first voltage across a first DC link capacitor of the multilevel power converter and a second voltage across a second DC link capacitor of the multilevel power converter. The generated PWM pulse pattern can be modified so that at least one pulse of a PWM signal of the PWM pulse pattern is adjusted based at least in part on one or more characteristics of the voltage error. In this manner, when switches of the multilevel power converter implement the duty cycle, at least one CMV pulse is rendered or injected into the circuity of the multilevel power converter and/or electrical power system. The one or more rendered CMV pulses may be used to balance the voltages across the first and second DC link capacitors, which can provide advantages, benefits, and technical effects. For instance, the PWM switching schemes of the present disclosure may facilitate minimal or otherwise reduced CMV in the circuitry of the multilevel power converter and/or electrical power system whilst also achieving DC link capacitor voltage balancing without need or reduced need for extra hardware, such as additional power sources. Moreover, compared to conventional PWM switching schemes that do not utilize reduced CMV schemes, the electromagnetic interference filter size associated with the multilevel power converter can be significantly reduced. Also, compared to conventional PWM switching schemes that do not utilize reduced CMV schemes, the PWM switching schemes of the present disclosure can eliminate or greatly reduces the challenges associated with CMV, such as shaft voltage, bearing currents, and electromagnetic interference. Other benefits and advantages may be realized as well.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A multilevel power converter for an aircraft, comprising: a plurality of switches; a first direct current (DC) link capacitor; a second DC link capacitor; and one or more processors configured to: generate, for a duty cycle of the multilevel power converter, a pulse width modulated pulse pattern in accordance with a reduced common mode voltage scheme; modify the pulse width modulated pulse pattern to render a modified pulse pattern; and cause the plurality of switches to implement the duty cycle based at least in part on the modified pulse pattern to render the common mode voltage pulse to balance a first voltage at the first DC link capacitor and a second voltage at the second DC link capacitor.

The multilevel power converter of any preceding clause, wherein the one or more processors configured to: receive the first voltage associated with the first DC link capacitor; receive the second voltage associated with the second DC link capacitor; and determine a voltage error based at least in part on the first voltage and the second voltage, and wherein in modifying the pulse width modulated pulse pattern, the one or more processors are configured to adjust a pulse of a pulse width modulated signal of the pulse width modulated pulse pattern based at least in part on one or more characteristics of the voltage error.

The multilevel power converter of any preceding clause, wherein the one or more characteristics of the voltage error include a magnitude and a polarity of the voltage error.

The multilevel power converter of any preceding clause, wherein the common mode voltage pulse rendered has a polarity that is based at least in part on the polarity of the voltage error.

The multilevel power converter of any preceding clause, wherein the common mode voltage pulse rendered has a width that is based at least in part on the magnitude of the voltage error.

The multilevel power converter of any preceding clause, wherein the common mode voltage pulse is one of a number of common mode voltage pulses rendered, and wherein the number of common mode voltage pulses rendered is either one or a plurality depending on the polarity and/or the magnitude of the voltage error.

The multilevel power converter of any preceding clause, wherein in adjusting the pulse of the pulse width modulated signal of the pulse width modulated pulse pattern, the one or more processors are configured to delay in time a rising edge and/or a falling edge of the pulse.

The multilevel power converter of any preceding clause, wherein in adjusting the pulse of the pulse width modulated signal of the pulse width modulated pulse pattern, the one or more processors are configured to advance in time a rising edge and/or a falling edge of the pulse.

The multilevel power converter of any preceding clause, wherein the pulse width modulated signal is one of a plurality of pulse width modulated signals of the pulse width modulated pulse pattern, and wherein in modifying the pulse width modulated pulse pattern, the one or more processors are configured to adjust a pulse of each one of the plurality of pulse width modulated signals, wherein the common mode voltage pulse rendered is one of a plurality of common mode voltage pulses rendered, and wherein a number of common mode voltage pulses of the plurality of common mode voltage pulses rendered is equal to a number of pulse width modulated signals of the plurality of pulse width modulated signals.

The multilevel power converter of any preceding clause, wherein the pulse width modulated signal is one of a plurality of pulse width modulated signals of the pulse width modulated pulse pattern, and wherein in modifying the pulse width modulated pulse pattern, the one or more processors are configured to adjust a pulse of each one of the plurality of pulse width modulated signals, and wherein the common mode voltage pulse rendered is one of at least two common mode voltage pulses rendered.

The multilevel power converter of any preceding clause, wherein the common mode voltage pulse rendered is one of a number of common mode voltage pulses rendered, and wherein the pulse width modulated signal is one of a number of pulse width modulated signals of the pulse width modulated pulse pattern, and wherein in modifying the pulse width modulated pulse pattern, the one or more processors are configured to adjust a pulse of each pulse width modulated signal of the pulse width modulated pulse pattern so that the number of common mode voltage pulses rendered is at least one less than the number of pulse width modulated signals in the pulse width modulated pulse pattern.

The multilevel power converter of any preceding clause, wherein in modifying the pulse width modulated pulse pattern, the one or more processors are configured to adjust both a falling edge and a leading edge of the pulse of the pulse width modulated signal.

The multilevel power converter of any preceding clause, wherein the one or more processors are further configured to: determine whether a magnitude of the voltage error is within a predetermined range, and wherein when the magnitude of the voltage error is not within the predetermined range, the pulse width modulated pulse pattern is modified to render the modified pulse pattern so that the pulse of the pulse width modulated signal is adjusted, and wherein when the magnitude of the voltage error is within the predetermined range, the pulse width modulated pulse pattern is not modified and the plurality of switches are caused to implement the duty cycle based at least in part on the pulse width modulated pulse pattern.

The multilevel power converter of any preceding clause, wherein the one or more processors are further configured to: determine whether a magnitude of the voltage error is within a first predetermined range or within a second predetermined range, and wherein when the magnitude of the voltage error is within the first predetermined range or the second predetermined range, the pulse width modulated pulse pattern is modified to render the modified pulse pattern so that the pulse of the pulse width modulated signal is adjusted, wherein the pulse of the pulse width modulated signal is adjusted so that more common mode voltage is injected when the magnitude of the voltage error is within the first predetermined range than when the magnitude of the voltage error is within the second predetermined range.

The multilevel power converter of any preceding clause, wherein in adjusting the pulse of the pulse width modulated signal of the pulse width modulated pulse pattern, the one or more processors are configured to delay and/or advance in time a rising edge and/or a falling edge of the pulse by correlating a magnitude of the voltage error to a predefined time for the delay and/or advance that is pre-programmed in control logic or looked up in a look up table.

The multilevel power converter of any preceding clause, further comprising: a first rail; a second rail; a mid rail; and a DC link electrically coupling the first rail and the second rail, the first DC link capacitor and the second DC link capacitor being positioned along the DC link, the mid rail being electrically coupled with the DC link between the first DC link capacitor and the second DC link capacitor.

The multilevel power converter of any preceding clause, wherein the voltages at the first DC link capacitor and at the second DC link capacitor are balanced so that the voltages are equal or within fifteen percent of one another.

The multilevel power converter of any preceding clause, wherein no additional hardware or sensors are included for the multilevel power converter to balance the voltages at the first DC link capacitor and the second DC link capacitor.

The multilevel power converter of any preceding clause, wherein in causing the plurality of switches to implement the duty cycle based at least in part on the modified pulse pattern so that the common mode voltage pulse is rendered to balance the voltages at the first DC link capacitor and the second DC link capacitor, minimal or zero distortion to differential mode voltages.

The multilevel power converter of any preceding clause, wherein the multilevel power converter is electrically coupled with an electric machine that is mechanically coupled with an engine of the aircraft.

A method of controlling a multilevel power converter for an aircraft, the method comprising: generating, for a duty cycle of the multilevel power converter, a pulse width modulated pulse pattern in accordance with a reduced common mode voltage scheme; receiving a first voltage associated with a first direct current (DC) link capacitor of the multilevel power converter; receiving a second voltage associated with a second DC link capacitor of the multilevel power converter; determining a voltage error based at least in part on the first voltage and the second voltage; modifying the pulse width modulated pulse pattern to render a modified pulse pattern, in modifying the pulse width modulated pulse pattern, a pulse of a pulse width modulated signal of the pulse width modulated pulse pattern is adjusted based at least in part on one or more characteristics of the voltage error; and switching a plurality of switches to implement the duty cycle based at least in part on the modified pulse pattern so that at least one common mode voltage pulse is rendered.

The method of any preceding clause, wherein the common mode voltage pulse is rendered to balance the first voltage at the first DC link capacitor and the second voltage at the second DC link capacitor.

The method of any preceding clause, wherein the common mode voltage pulse is one of a plurality of common mode voltage pulses rendered.

The method of any preceding clause, wherein the one or more characteristics of the voltage error include a polarity of the voltage error, and wherein the common mode voltage pulse rendered has a polarity that is based at least in part on the polarity of the voltage error.

The method of any preceding clause, wherein the one or more characteristics of the voltage error include a magnitude of the voltage error, and wherein the common mode voltage pulse rendered has a width that is based at least in part on the magnitude of the voltage error.

A non-transitory computer readable medium comprising computer-executable instructions, which, when executed by one or more processors of a controller of a multilevel power converter for an aircraft, cause the one or more processors to implement a pulse width modulated switching scheme, in implementing the pulse width modulated switching scheme, the one or more processors are configured to: generate a pulse width modulated pulse pattern in accordance with a reduced common mode voltage scheme; receive a first voltage associated with a first direct current (DC) link capacitor of the multilevel power converter; receive a second voltage associated with a second DC link capacitor of the multilevel power converter; determine a voltage error based at least in part on the first voltage and the second voltage; modify the pulse width modulated pulse pattern to render a modified pulse pattern, in modifying the pulse width modulated pulse pattern, the one or more processors are configured to adjust a pulse of a pulse width modulated signal of the pulse width modulated pulse pattern based at least in part on one or more characteristics of the voltage error; and cause the plurality of switches to modulate based at least in part on the modified pulse pattern so that a common mode voltage pulse is rendered.

The non-transitory computer readable medium of any preceding clause, wherein the common mode voltage pulse is rendered to balance the first voltage at the first DC link capacitor and the second voltage at the second DC link capacitor.

The non-transitory computer readable medium of any preceding clause, wherein the common mode voltage pulse is one of a plurality of common mode voltage pulses rendered.

The non-transitory computer readable medium of any preceding clause, wherein the one or more characteristics of the voltage error include a polarity of the voltage error, and wherein the common mode voltage pulse rendered has a polarity that is based at least in part on the polarity of the voltage error.

The non-transitory computer readable medium of any preceding clause, wherein the one or more characteristics of the voltage error include a magnitude of the voltage error, and wherein the common mode voltage pulse rendered has a width that is based at least in part on the magnitude of the voltage error.

A multilevel power converter for an aircraft, comprising: a plurality of switches; a first direct current (DC) link capacitor; a second DC link capacitor; one or more processors configured to: generate, for a duty cycle of the multilevel power converter, a pulse width modulated pulse pattern in accordance with a reduced common mode voltage scheme; receive a first voltage associated with the first DC link capacitor; receive a second voltage associated with the second DC link capacitor; determine a voltage error based at least in part on the first voltage and the second voltage; modify the pulse width modulated pulse pattern to render a modified pulse pattern, in modifying the pulse width modulated pulse pattern, the one or more processors are configured to adjust a pulse of a pulse width modulated signal of the pulse width modulated pulse pattern based at least in part on one or more characteristics of the voltage error; and cause the plurality of switches to implement the duty cycle based at least in part on the modified pulse pattern so that a common mode voltage pulse is rendered.

A controller, comprising: one or more memory devices; and one or more processors configured to implement a pulse width modulated switching scheme for a multilevel power converter, in implementing the pulse width modulated switching scheme, the one or more processors are configured to: generate a pulse width modulated pulse pattern in accordance with a reduced common mode voltage scheme; receive a first voltage associated with a first direct current (DC) link capacitor of the multilevel power converter; receive a second voltage associated with a second DC link capacitor of the multilevel power converter; determine a voltage error based at least in part on the first voltage and the second voltage; modify the pulse width modulated pulse pattern to render a modified pulse pattern, in modifying the pulse width modulated pulse pattern, the one or more processors are configured to adjust a pulse of a pulse width modulated signal of the pulse width modulated pulse pattern based at least in part on one or more characteristics of the voltage error; and cause a plurality of switches of the multilevel power converter to modulate based at least in part on the modified pulse pattern so that a common mode voltage pulse is rendered.

A hybrid-electric propulsion system for a vehicle, comprising: a gas turbine engine; an electric machine mechanically coupled with the gas turbine engine; a multilevel power converter electrically coupled with the electric machine, the multilevel power converter comprising a plurality of switches; a first direct current (DC) link capacitor; a second DC link capacitor; and one or more processors configured to: generate, for a duty cycle of the multilevel power converter, a pulse width modulated pulse pattern in accordance with a reduced common mode voltage scheme; modify the pulse width modulated pulse pattern by adjusting a timing of a rising edge and/or a falling edge of at least one pulse of a pulse width modulated signal of the pulse width modulated pulse pattern so as to render a modified pulse pattern; and cause the plurality of switches to implement the duty cycle based at least in part on the modified pulse pattern so that a common mode voltage pulse, which is caused by adjusting the timing of the rising edge and/or the falling edge of the at least one pulse, is rendered to balance voltages at the first DC link capacitor and the second DC link capacitor.

The hybrid-electric propulsion system of any preceding clause, wherein the vehicle is an aircraft.

What is claimed is:

1. A multilevel power converter for an aircraft, comprising:
   a plurality of switches;
   a first direct current (DC) link capacitor;
   a second DC link capacitor; and
   one or more processors configured to:
     generate, for a duty cycle of the multilevel power converter, a pulse width modulated pulse pattern in accordance with a reduced common mode voltage scheme;
     modify the pulse width modulated pulse pattern to render a modified pulse pattern by delaying in time or advancing in time at least one of a falling edge or a rising edge of a pulse of a pulse width modulated signal of the pulse width modulated pulse pattern; and
     cause the plurality of switches to implement the duty cycle based at least in part on the modified pulse pattern to render a common mode voltage pulse to balance a first voltage at the first DC link capacitor with a second voltage at the second DC link capacitor.

2. The multilevel power converter of claim 1, wherein the one or more processors configured to:
   receive the first voltage associated with the first DC link capacitor;
   receive the second voltage associated with the second DC link capacitor; and
   determine a voltage error based at least in part on the first voltage and the second voltage, and
   wherein in modifying the pulse width modulated pulse pattern, the one or more processors are configured to adjust the pulse of the pulse width modulated signal of the pulse width modulated pulse pattern based at least in part on one or more characteristics of the voltage error.

3. The multilevel power converter of claim 2, wherein the one or more characteristics of the voltage error include a magnitude and a polarity of the voltage error.

4. The multilevel power converter of claim 3, wherein the common mode voltage pulse rendered has a polarity that is based at least in part on the polarity of the voltage error.

5. The multilevel power converter of claim 3, wherein the common mode voltage pulse rendered has a width that is based at least in part on the magnitude of the voltage error.

6. The multilevel power converter of claim 3, wherein the common mode voltage pulse is one of a number of common mode voltage pulses rendered, and wherein the number of common mode voltage pulses rendered is either one or a plurality depending on the polarity and/or the magnitude of the voltage error.

7. The multilevel power converter of claim 2, wherein in adjusting the pulse of the pulse width modulated signal of the pulse width modulated pulse pattern, the one or more processors are configured to delay in time at least one of the rising edge or the falling edge of the pulse.

8. The multilevel power converter of claim 2, wherein in adjusting the pulse of the pulse width modulated signal of the pulse width modulated pulse pattern, the one or more processors are configured to advance in time at least one of the rising edge or the falling edge of the pulse.

9. The multilevel power converter of claim 2, wherein the pulse width modulated signal is one of a plurality of pulse width modulated signals of the pulse width modulated pulse pattern, and wherein in modifying the pulse width modulated pulse pattern, the one or more processors are configured to adjust a pulse of each one of the plurality of pulse width modulated signals,
wherein the common mode voltage pulse rendered is one of a plurality of common mode voltage pulses rendered, and
wherein a number of common mode voltage pulses of the plurality of common mode voltage pulses rendered is equal to a number of pulse width modulated signals of the plurality of pulse width modulated signals.

10. The multilevel power converter of claim 2, wherein the pulse width modulated signal is one of a plurality of pulse width modulated signals of the pulse width modulated pulse pattern, and wherein in modifying the pulse width modulated pulse pattern, the one or more processors are configured to adjust a pulse of each one of the plurality of pulse width modulated signals, and
wherein the common mode voltage pulse rendered is one of at least two common mode voltage pulses rendered.

11. The multilevel power converter of claim 2, wherein the common mode voltage pulse rendered is one of a number of common mode voltage pulses rendered, and wherein the pulse width modulated signal is one of a number of pulse width modulated signals of the pulse width modulated pulse pattern, and
wherein in modifying the pulse width modulated pulse pattern, the one or more processors are configured to adjust a pulse of each pulse width modulated signal of the pulse width modulated pulse pattern so that the number of common mode voltage pulses rendered is at least one less than the number of pulse width modulated signals in the pulse width modulated pulse pattern.

12. The multilevel power converter of claim 2, wherein in modifying the pulse width modulated pulse pattern, the one or more processors are configured to adjust both the falling edge and the rising edge of the pulse of the pulse width modulated signal.

13. The multilevel power converter of claim 2, wherein the one or more processors are further configured to:
determine whether a magnitude of the voltage error is within a predetermined range, and
wherein when the magnitude of the voltage error is not within the predetermined range, the pulse width modulated pulse pattern is modified to render the modified pulse pattern so that the pulse of the pulse width modulated signal is adjusted, and
wherein when the magnitude of the voltage error is within the predetermined range, the pulse width modulated pulse pattern is not modified and the plurality of switches are caused to implement the duty cycle based at least in part on the pulse width modulated pulse pattern.

14. The multilevel power converter of claim 2, wherein the one or more processors are further configured to:
determine whether a magnitude of the voltage error is within a first predetermined range or within a second predetermined range, and
wherein when the magnitude of the voltage error is within the first predetermined range or the second predetermined range, the pulse width modulated pulse pattern is modified to render the modified pulse pattern so that the pulse of the pulse width modulated signal is adjusted, wherein the pulse of the pulse width modulated signal is adjusted so that more common mode voltage is injected when the magnitude of the voltage error is within the first predetermined range than when the magnitude of the voltage error is within the second predetermined range.

15. The multilevel power converter of claim 2, wherein in adjusting the pulse of the pulse width modulated signal of the pulse width modulated pulse pattern, the one or more processors are configured to delay and/or advance in time the rising edge and/or the falling edge of the pulse by correlating a magnitude of the voltage error to a predefined time for the delay and/or advance that is pre-programmed in control logic or looked up in a look up table.

16. The multilevel power converter of claim 1, further comprising:
a first rail;
a second rail;
a mid rail; and
a DC link electrically coupling the first rail and the second rail, the first DC link capacitor and the second DC link capacitor being positioned along the DC link, the mid rail being electrically coupled with the DC link between the first DC link capacitor and the second DC link capacitor.

17. The multilevel power converter of claim 1, wherein the voltages at the first DC link capacitor and at the second DC link capacitor are balanced so that the voltages are equal or within fifteen percent of one another.

18. The multilevel power converter of claim 1, wherein the multilevel power converter is electrically coupled with an electric machine that is mechanically coupled with an engine of the aircraft.

19. A non-transitory computer readable medium comprising computer-executable instructions, which, when executed by one or more processors of a controller of a multilevel power converter for an aircraft, cause the one or more processors to implement a pulse width modulated switching scheme, in implementing the pulse width modulated switching scheme, the one or more processors are configured to:
generate a pulse width modulated pulse pattern in accordance with a reduced common mode voltage scheme;
receive a first voltage associated with a first direct current (DC) link capacitor of the multilevel power converter;
receive a second voltage associated with a second DC link capacitor of the multilevel power converter;
determine a voltage error based at least in part on the first voltage and the second voltage;
modify the pulse width modulated pulse pattern to render a modified pulse pattern, in modifying the pulse width modulated pulse pattern, the one or more processors are configured to delay in time or advance in time at least one of a falling edge or a rising edge of a pulse of a pulse width modulated signal of the pulse width modulated pulse pattern based at least in part on one or more characteristics of the voltage error; and cause the plurality of switches to modulate based at least in part on the modified pulse pattern so that a common mode voltage pulse is rendered.

20. A method of controlling a multilevel power converter for an aircraft, the method comprising:

generating, for a duty cycle of the multilevel power converter, a pulse width modulated pulse pattern in accordance with a reduced common mode voltage scheme;

receiving a first voltage associated with a first direct current (DC) link capacitor of the multilevel power converter;

receiving a second voltage associated with a second DC link capacitor of the multilevel power converter;

determining a voltage error based at least in part on the first voltage and the second voltage;

modifying the pulse width modulated pulse pattern to render a modified pulse pattern, in modifying the pulse width modulated pulse pattern, at least one of a falling edge or a rising edge of a pulse of a pulse width modulated signal of the pulse width modulated pulse pattern is delayed in time or advanced in time based at least in part on one or more characteristics of the voltage error; and switching a plurality of switches to implement the duty cycle based at least in part on the modified pulse pattern so that at least one common mode voltage pulse is rendered.

* * * * *